US005745748A

United States Patent [19]

Ahmad et al.

[11] Patent Number: 5,745,748
[45] Date of Patent: Apr. 28, 1998

[54] SYSTEM AND METHOD FOR DIRECT ACCESSING OF REMOTE DATA

[75] Inventors: Nauman Ahmad, Shawnee; Joseph Arthur Burnett, Overland Park, both of Kans.

[73] Assignee: Sprint Communication Co. L.P., Kansas City, Mo.

[21] Appl. No.: 352,942

[22] Filed: Dec. 9, 1994

[51] Int. Cl.$^6$ .................................................... G06F 17/30
[52] U.S. Cl. .......................................... 395/610; 395/611
[58] Field of Search ........................... 364/200; 395/600, 395/200.01, 182.03, 200.09, 182.04, 601, 650, 610, 611, 604

[56] References Cited

U.S. PATENT DOCUMENTS

| 4,742,467 | 5/1988 | Messerich et al. | 364/200 |
|---|---|---|---|
| 4,751,635 | 6/1988 | Kret | 364/200 |
| 4,780,821 | 10/1988 | Crossley | 364/200 |
| 4,815,030 | 3/1989 | Cross et al. | 364/900 |
| 5,058,000 | 10/1991 | Cox et al. | 364/200 |
| 5,091,852 | 2/1992 | Tsuchida et al. | 395/601 |
| 5,126,932 | 6/1992 | Wolfson et al. | 364/131 |
| 5,185,857 | 2/1993 | Rozmanith et al. | 395/604 |
| 5,201,047 | 4/1993 | Maki et al. | 395/601 |
| 5,208,811 | 5/1993 | Kashio et al. | 370/94.1 |
| 5,253,341 | 10/1993 | Rozmanith et al. | 395/200 |
| 5,267,351 | 11/1993 | Reber et al. | 395/601 |
| 5,274,801 | 12/1993 | Gordon et al. | 395/601 |
| 5,276,732 | 1/1994 | Stent et al. | 379/93 |
| 5,430,876 | 7/1995 | Schreiber et al. | 395/650 |
| 5,432,930 | 7/1995 | Song | 395/610 |
| 5,465,351 | 11/1995 | Lemmo | 395/600 |
| 5,473,772 | 12/1995 | Halliwell et al. | 395/650 |
| 5,513,314 | 4/1996 | Kandasamy et al. | 395/182.04 |
| 5,515,508 | 5/1996 | Pettus et al. | 395/200.01 |
| 5,537,533 | 7/1996 | Staheli et al. | 395/182.03 |
| 5,544,320 | 8/1996 | Konrad | 395/200.09 |
| 5,548,726 | 8/1996 | Pettus | 395/200.09 |
| 5,564,050 | 10/1996 | Barber et al. | 395/600 |
| 5,574,906 | 11/1996 | Morris | 395/601 |
| 5,640,550 | 6/1997 | Coker | 395/604 |

OTHER PUBLICATIONS

Carpenter et al, "Distributed Heterogeneous Information Systems", IEE, abstract only p. 541, Jan. 1994.
Kapp & Joe F. Leben, *IMS Programming Techniques* (2d ed).
Schulken, Susan & Peter Schwaller, *Communicating With APPC and CPI-C: A Technical Overview* (1993).
Kelsey, David, *Investing in APPC; A Business Perspective* (1993).

*Primary Examiner*—Wayne Amsbury
*Assistant Examiner*—Frantz Coby
*Attorney, Agent, or Firm*—Harley R. Ball; Jed W. Caven

[57] ABSTRACT

A data access client program resides on a local computer and a data access server program resides on a remote computer. The programs are adapted to enable an application program on the local computer to access data stored on the remote computer. The client and server programs are adapted to communicate with one another over a communication link, preferably one employing the Advanced Program to Program Communication (APPC) protocol. The user stores the attributes of remote files to be accessed on a predetermined computer. When the application program on the local computer issues a remote data access request, the data access client program communicates the request to the data access server program. The server is configured to obtain the previously stored file attributes and to access the data requested by the application program based thereon. The server returns the requested information to the client, which in turn provides the information to the application program. The invention is adapted for use with a COBOL application development system and for accessing an individual record of the remote data file, such as during debugging operations in the application development system.

85 Claims, 21 Drawing Sheets

DBD MAPPING FACILITY

| ITEM NO. | DBD NAME | PSB NAME | PCB NAME |
|---|---|---|---|
| 07 | CLZOWSDB | NXAZAPP1 | NXA1PCB7 |
| 08 | ERMOMSTR | PC001A01 | ERMOMSTR |
| 09 | TLMOMSTR | PC003A01 | TLMOMSTR |
| 10 | TLNOMSTR | PC003A01 | TLNOMSTR |
| 11 | TLOOMSTR | PC001A01 | TLOOMSTR |
| 12 | TLPOMSTR | PC001A01 | TLPOMSTR |

FIG. 15

SYSTEM AND METHOD FOR DIRECT ACCESSING OF REMOTE DATA

FIELD OF THE INVENTION

This invention relates to data processing systems and, more particularly, to a system and method for accessing remote data by an application program.

BACKGROUND OF THE INVENTION

Many companies, governmental agencies and other entities depend heavily on data stored in electronic form on computer systems to conduct their business. These data often comprise a large amount of information (i.e. multiple gigabytes) and frequently must be capable of near simultaneous access or update by many users. To fulfill these needs, such data are often stored and manipulated on a mainframe-class computer ("mainframe computer") capable of access over a network. The data typically reside on a hard disk, tape or other media associated with the mainframe computer.

Because of the large amount of data involved, a computer program is often employed to simplify processing the data. Such a program is termed an "application program." A typical large-scale application program could, for example, rapidly analyze telecommunication billing data regarding millions of individual telephone calls. In a business setting, application programs are often written using a higher level computer programming language such as COBOL or FORTRAN. Application programs can also be written in assembly language or other programming languages.

The process of writing a new application program or modifying an existing application program is termed "application development." The development process generally involves writing source code to carry out the tasks desired for the application program and then compiling and linking the source code to produce an executable version of the program. Extensive testing of a program is often required before a final or "production" version can be produced. The cycle of writing, testing and modifying the source code can be repeated many times before application development is complete. If the application program will access data files, the development version of the program should be tested using the actual data to be used by the production version.

In the past, the development of mainframe-based application programs to use data stored thereon often occurred on the mainframe computer itself. The application program under development could then directly access this data during testing. As the need to access data stored on mainframe computers increased, too did the need for application programs to facilitate such access. This in turn often could require the purchase of additional mainframe-class hardware, which was, and continues to be, expensive.

The debut of the personal computer (PC) presented a less expensive means for developing mainframe-based application programs. In such a setting, the cycle of writing, testing and modifying the source code occurs on the PC, and its central processing unit executes the application program under development. When a final version of the application program has been developed on the PC, the source code is transferred to the mainframe computer. After sometimes extensive modification, the program typically is then placed in production.

Besides cost saving considerations, the shift to PC-based application development was prompted by new, versatile software specifically designed for developing applications on PCs. Often known as an "application development system," this software includes, for example, the commercially available product Programmer's Workbench with the Mainframe Development Environment from Micro Focus, Ltd., Palo Alto, Calif., running under IBM's well-known PC operating system OS/2. Such a system enables the application programmer to write, test and modify an application program in an efficient, convenient manner. A program can be executed on the PC from within the development system, which can provide information for refining the program as well as for correcting errors or "debugging" the program.

The debugging capability of an application development system is an important diagnostic tool. It assists in locating logic errors in the program under development. For example, the system typically enables a programmer to define a "breakpoint" without having to modify the source code. As known to those skilled in the art, a breakpoint is a location in the source code of a program selected by the programmer. During execution, the program pauses at the breakpoint. Execution can be resumed and again halted when a subsequent breakpoint is encountered. Similarly, the programmer can direct the application development system to execute one line of the source code at a time in logical succession, pausing between lines. This debugging process is often termed "step execution." Both breakpoint and step execution debugging techniques allow memory contents to be examined or altered as execution progresses to help in locating errors. Application development systems often further allow the programmer to "animate" the step execution. During animated execution, the source code line being executed is typically highlighted on the monitor. The highlighting moves from one line of source code to the next in logical sequence as execution progresses. The animation speed is typically slowed to allow a programmer to visually follow the source code logic as execution continues. Other diagnostic capabilities known to those skilled in the art may be present in an application development system.

Developing mainframe-class application programs on PCs, however, has presented problems. Ideally, an application program would access desired data directly (i.e. accessing the data where they normally reside on the mainframe computer in the original, most current form). Application programs under development in a PC-based application development system typically lacked such direct access to data stored on a remote computer. Rather, a file containing desired data usually first had to be downloaded from the mainframe computer to a file on the application development PC. The PC-based application then could access the data contained in the PC-based file. For example, the commercially available software package "Stingray," sold by Micro Focus, Ltd., Palo Alto, Calif., permits programmers to develop applications on a PC for processing data files stored in the well-known IBM Information Management System or IMS format, which is in use on numerous mainframe computers. To use such software with a PC-based application program, the IMS data and other related files are first downloaded from the remote computer to the PC.

This nondirect access to the desired mainframe-based data poses problems. Data files can comprise multiple gigabytes. Transferring such an amount of information across most computer networks is time-consuming, and network performance can be unacceptably degraded during the transfer. Furthermore, under present technology, writable storage capacity is typically less than one gigabyte on a PC, which could often preclude transfer of the entire data. An alternative therefore is to download a subset of the data for testing purposes. This too presents undesirable limitations because the subset might not be representative of the entire data.

When multiple, related databases or other files are involved, the problems of downloading a subset of the data are compounded. Relational databases and hierarchical databases, for example, can be ill-suited to analyses performed on only database subsets. In short, false analyses and inadequate testing could result when critical portions of the data were absent from the subset. Errors could more likely manifest themselves for the first time when the application was placed in production, often requiring costly remedial measures.

Downloading mainframe-based data to a PC for application development purposes presents other disadvantages. The data on the mainframe computer could be subject to frequent modifications. Multiple transfers of the data to the PC could be required to ensure that the test data adequately represented the actual data. The problem is further complicated if multiple large databases are to be accessed. Furthermore, if the data to be downloaded are in the EBCDIC format, as is common for mainframe computers, it must often be converted to the ASCII format for PC storage or use. It could be very time-consuming to do this conversion for large data files being transferred to multiple PCs. Other file management problems well known to those skilled in the art are also present.

Application programs executing in a PC-based application development system also typically lacked the capability to directly modify data on a mainframe computer. Such modification operations can include maintaining multiple positions in a data file for the purpose of sequential retrieval, a technique known to those skilled in the art, and altering information in the file. A nondirect means for modifying remote data would have involved cumbersome intermediate steps and a substantial data transfer between the PC and the mainframe computer. These steps would generally be time-consuming and difficult if large amounts of data were involved. Similarly, PC-based application programs typically lacked the ability to manipulate data on a mainframe computer directly, such as generating a report on a mainframe computer using data stored thereon in the IMS format.

Various software products are available that access remote data such as EDA/SQL from Information Builders, Inc. and Microsoft Access from Microsoft Corporation. Additional products also exist for accessing data within an application development system such as Remote IMS from Microfocus Corporation. However, none of these products provide access to multiple file formats within a COBOL application development environment.

SUMMARY AND OBJECTS OF THE INVENTION

To solve these and other problems, a system and method were needed to enable a mainframe-class application program under development in a PC-based COBOL development system to directly access data on a mainframe computer to which the PC was electronically linked. Such accessing operations include the reading, writing, modifying and deleting of data. A system and method were also needed to enable a PC-based application program to issue commands for accessing data as though the PC-based application were executing on the mainframe computer.

Accordingly, an object of the present invention is to improve the capability of PC-based application development systems to develop applications intended for use on a remote computer. A related object is to enable the application program under development in an application development system to directly access data stored in a plurality of formats on a remote computer, including the Information Management System (IMS) format. Another related object is to enable remote data to be accessed directly by an application program during step execution or similar debugging operations within an application development system. A further related object is to enable such access with the Advanced Program to Program Communication (APPC) protocol.

Another object of the present invention is to enable an application program running on a PC to access an entire remote data file even when the size of that data file would exceed the writable storage capacity of the PC. A further related object is to enable access to a remote data file by application programs running on a plurality of PCs.

Another object of the present invention is to enable an application program executing on a PC to directly store and manipulate data in a plurality of file formats on a remote computer and thereby reduce data transfer operations between the PC and the remote computer.

Another object of this invention is to permit a mainframe application program under development on a PC to execute commands for accessing data on the mainframe computer in a form that will require minimal source code conversion when the application is placed in production on the mainframe computer. A related object is to enable the commands so issued to be executed on the mainframe computer without requiring additional user intervention.

To accomplish these and other objectives, the present invention employs a data access server program and a data access client program. The user preferably begins by storing on a predetermined computer the file attributes for the remote data files to be accessed, either for input or output. The file attributes can include the fully qualified file name and other information necessary to access the remote data file under the operating system of the remote computer containing the remote data file. The file attributes for a data file on a remote computer having a sequential or an indexed sequential access format are preferably stored on the remote computer itself so as to be accessible by the data access server. For files having the Information Management System (IMS) format, the file attributes include the Data Base Description (DBD) and Program Specification Block (PSB) information for the remote IMS data to be accessed, which are well known to those skilled in the art and are further described in the publication *IMS Programming Techniques* (Second Edition 1986) by D. Kapp and J. Leben. For IMS format files, the file attributes are stored on the local computer and are based on the PSB and DBD information that has preferably been downloaded from the remote computer containing the IMS files to be accessed. The data access server is preferably adapted to obtain information for accessing desired IMS files from the data access client based on these file attributes. Of course, a user could alternatively configure the invention to supply selected file attributes to the data access server in another desired manner.

After the file attributes have been stored on a predetermined computer for each remote file to be accessed, the user preferably creates a "map file" on the local computer, at least if remote sequential or indexed sequential access format files are to be accessed. As known to those skilled in the art, a map file in an application development system generally is a text file cross-referencing a file name used in the application program to the name of the file as referenced by the operating system of the computer on which the file resides. A sample map file for use by the present invention is further described below. As contemplated by the present invention, the map file generally employs conventional cross-referencing for data files stored locally. For remote data files, however, a remote file designator is preferably employed in place of a fully qualified file name indicating the designated file is stored remotely. An application development system is preferably employed that is capable of accessing such map files and following a procedure, such as that associated with the present invention, when the application program seeks to access a file having a remote file designator in the map file.

After the file attributes and map file information have been entered, a user may then enter the application development system and run an application program adapted to access remote data. During execution, the application program may encounter an input or output statement, such as a READ or WRITE statement in a COBOL program. Working together, the application development system and the data access client program are preferably configured to determine whether the executed input or output statement requires access to a remote file. For non-IMS files, this determination is based on the information in the map file. For IMS files, the application program invokes a separate procedure to access a remote IMS file. The data access client resides on the local computer, preferably as a dynamic-link library (DLL), a file construct well known to those skilled in the art. If a given input or output statement in the application program merely seeks to access files stored on the local computer, control is preferably returned to the application development system for conventional processing. If access to a remote file is sought, the data access client communicates with the data access server program on the remote computer to access and process the data as directed by the application program. The data access server obtains the file attributes of the remote file being accessed either from the predetermined computer or from the data access client. It then issues directives to implement the commands received from the data access client. The data access server communicates the results of the directed operation to the data access client, which returns the desired information to the application program. Operations to be facilitated by the data access server can include reading, storing, modifying, processing and deleting data on the remote computer. The data access client and the data access server communicate with one another over a communication link, preferably one employing the well-known Advanced Program to Program Communication (APPC) protocol.

Mainframe class computers typically have network security systems that limit access to authorized users. In the preferred embodiment, the invention provides a network access capability to enable a PC-user to enter the necessary security information and thereby to enable such information to be supplied automatically to the remote computer when data stored thereon is accessed by an application program on the local computer.

In another aspect of the invention, the user is preferably provided with a convenient system for entering the necessary file attributes. In the preferred embodiment of the invention, the user is provided with a file attribute client program and a file attribute server program, at least for remote files having a sequential access or indexed sequential access format. These programs cooperate to enable the file attributes to be stored on the remote computer so as to be obtainable by the data access server program. A convenient means is also preferably provided for entering the file attributes for IMS files, such as the DBD, PSB and PCB information.

The invention is preferably used with an operating system on the local computer, such as OS/2, that supports the use of icons. Iconic interfaces are provided for initiating functions such as network access and others. The desired function can then be invoked by selecting the icon corresponding to the function with a pointing device, such as a mouse. Software and methods for creating such iconic interfaces are well-known to those skilled in the art.

In the present invention, different data access client and server programs are employed depending on the particular type of file format being accessed. As noted above and as known to those skilled in the art, electronic data can be stored and accessed in a variety of ways. Data may be stored in a sequential access format. Data may also be stored in an indexed sequential access format, a form of which is the well-known "VSAM" format. Data can also be stored under the control of a computer database management system, such as IMS. Accessing IMS or other database data often requires reference to auxiliary files containing information about the data. In the IMS environment, a Data Base Description (DBD) describes the physical structure of the data. A Program Specification Block (PSB) defines the logical structure of the data. A PSB is composed of one or more Program Communication Blocks (PCB). The DBD, PSB and PCB constructs are well known to those familiar with IMS. Before accessing remote IMS files, the user preferably downloads to the PC copies of DBDs and PSBs for the remote IMS data files to be accessed by the PC-based application program. The well-known process of "generating" the DBD or the PSB, also known respectively as DBDGEN and PSBGEN, is then performed on the PC using a commercially available software, such as the Stingray software. A data access client program is preferably configured to access the generated DBD and PSB information prior to communication with the data access server program and to utilize this information to formulate a transaction sent to the data server program. The various data access client programs preferably reside on the local computer. A given application program could invoke more than one data access client or data access server depending upon the types of remote data files being accessed.

The invention thus solves the existing problems encountered when an application program seeks to directly access data residing on a remote computer. It offers a much improved alternative to the downloading of large data files to PCs and similar small computers for processing by the application program. It further enables the source code for an application under development on a PC to be almost identical to that needed to run the application on the mainframe computer when the application is placed in production. This avoids time-consuming and costly source code conversions and the accompanying increased testing needed to ensure that an accurate conversion occurred. Furthermore, from a programmer's perspective, the application reads, processes and writes data when executing on the PC as would the application when executing on the mainframe computer. Such a capability enhances a programmer's ability to eliminate logic errors before the program under development is placed in production, which helps to avoid subsequent costly remedial measures.

In addition, the invention enhances the usefulness of application development systems for developing applications on a PC intended for use on a remote computer. It permits the application program executing in the application development system to process data in a remote file as though the application were executing on the remote computer itself. It further permits the application program to access the remote data one record at a time. This record-by-record processing of the remote data is often preferable to merely downloading to the local computer an entire remote file, or a multi-record subset thereof. Such processing makes possible efficient debugging of an application program that accesses remote data. Further, the present invention enables multi-positional, record-by-record sequential access of remote data.

BRIEF DESCRIPTION OF THE DRAWINGS

In the accompanying drawings, which form a part of the specification and are to be read in conjunction therewith and in which like reference numerals are used to indicate like parts in the various views:

FIG. 15 is an illustration of the DBD cross-reference table of the present invention.

DETAILED DESCRIPTION OF PREFERRED EMBODIMENTS

The invention is preferably carried out in a data processing environment comprising a local computer containing an application program, a remote computer containing data files and a communication link enabling data transfer between the local computer and the remote computer. The local computer is preferably a personal computer (PC) or similar unit. The application program on the local computer is preferably adapted to access data while executing within an application development system. The remote computer is preferably a mainframe class computer, such as an IBM model ES-9000 Series, containing data files, although other computer systems, including a local area network arrangement, are contemplated for use with the invention. The communication link preferably utilizes the Advanced Program to Program Communication protocol, although the invention could be configured for use with other protocols.

Figure 1:
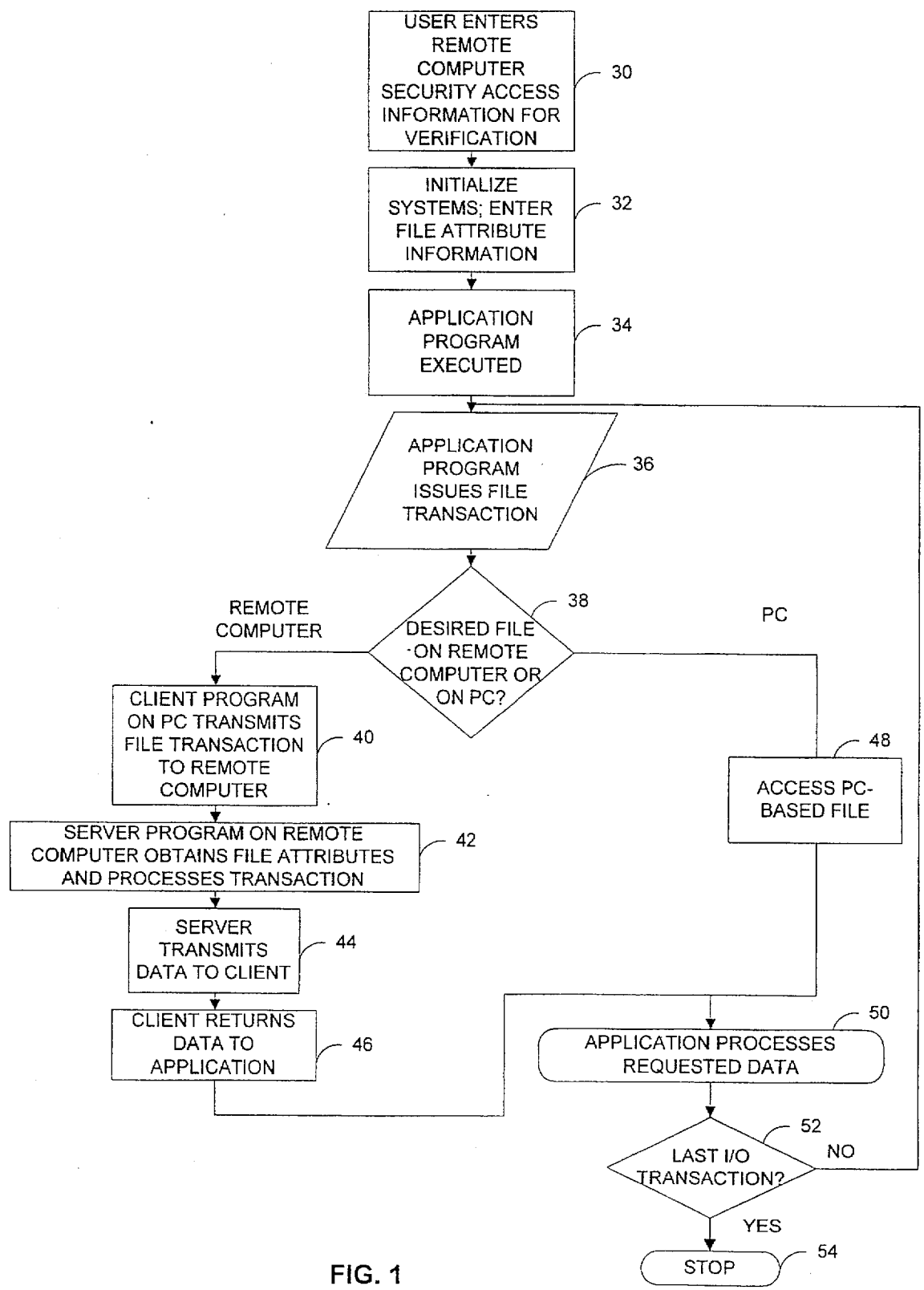
FIG. 1 is a flowchart overview of the invention.

FIG. 1 is a flowchart overview of a system in accordance with the preferred embodiment of the invention. A user at a local computer accesses as necessary the network security system of the remote computer at step 30 using a network security access procedure, such as that shown in further detail in FIG. 2. The user enters a user identification and password, which generally is verified by the remote computer and stored for later use on the local computer. At step 32, the user provides initial information to the necessary systems such as the Information Management System, shown in further detail in FIG. 5, and the map file, shown in further detail in FIG. 14. File attributes for files to be accessed are then entered and stored on a predetermined computer for later access as shown more fully in FIGS. 3, 4, 6 and 7. The predetermined computer may be the local computer, the remote computer or another computer coupled with the local computer or the remote computer. At step 34, a user application program is executed, preferably from within an application development system. At step 36, the application program issues a file transaction command such as a READ or a WRITE statement in a COBOL program. At step 38, the invention preferably is adapted, in conjunction with the application development system, to determine whether the data file for access is located on a remote computer. If not, the file transaction is processed at step 48 and the desired data is returned to the application at step 50 for processing in a manner conventional for processing local files. If access to a remote data file is sought, control passes at step 38 to the data access client program at step 40, which formulates a data access command corresponding to the file transaction issued by the application program. The data access command is transmitted over the communication link to the data access server on the remote computer. At step 42, the data access server processes the data access command and accesses the desired data file based on the stored file attributes. Accessing the data file could include reading from, writing to, modifying or deleting records in the data file or other analogous operations thereon. Alternatively, the data access command could direct, for example, the creation of a report on the remote computer. At step 44, the data access server program responds to the data access client program by transmitting the results of the data access command. Upon receipt of this information at step 46, the data access client returns the requested information to the application program, which processes the information in a desired manner at step 50. As shown at step 52, this process is capable of repetition until the application program is completed or the user otherwise intervenes to cause a halt in execution at step 54.

Most larger remote computer facilities have a security access system to prevent unauthorized access. As known to those skilled in the art, a user generally must supply the security system with a valid user identification and a password. The present invention preferably provides the user with a convenient means of initially supplying this information to the remote computer so that thereafter, as necessary, the information can be furnished to the remote computer without user intervention to enable the application program on the local computer to access a data file on the remote computer.

Figure 2:
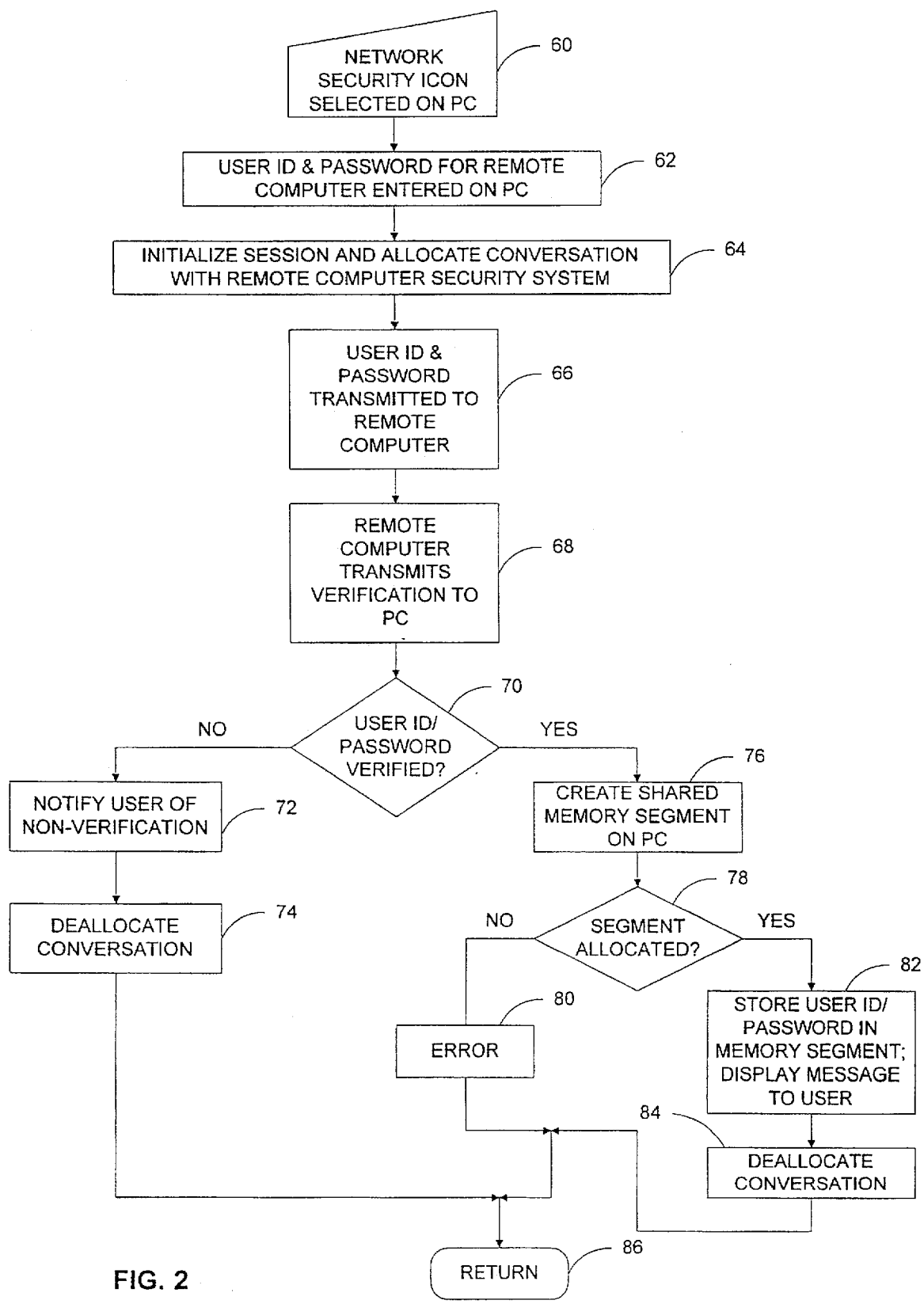
FIG. 2 is a flowchart of the network security access procedure.

FIG. 2 is a flowchart overview of the remote computer security access procedure associated with the invention. As known to those skilled in the art, iconic interfaces are desirable to users. At step 60, the invention preferably provides the user with a recognizable icon on the local computer monitor for invoking the remote security access capability of the invention. After the user has selected the remote security icon, the invention prompts the user for the user's identification and password necessary for proper access of the desired remote computer at step 62. As noted, this information is preferably capable of manual entry at the local computer. The preferred embodiment of the invention implements the remote computer security access procedure with a client program-server program configuration. The invention preferably operates under the well-known Advanced Program to Program Communication protocol (APPC), which is adaptable to client-server applications. As known to those skilled in the art, an APPC user begins by initiating an APPC session, which generally involves initiating an APPC conversation with a server program on the remote computer as shown in step 64. The present invention preferably employs a security access client program on the local computer that initiates a conversation with a security access server program on the remote computer to carry out the remote security access procedure. At step 66, the user identification and password previously stored on the PC are transmitted from the local computer to the remote computer over the communication link. At step 68, the security access server program analyzes the user identification and password for authorization, and transmits the result of this analysis to the security access client program on the local computer. At step 70, if the user identification and password were not verified, the user is notified of the non-verification at step 72. The APPC conversation with the remote computer security access server program is deallocated at step 74 whereupon control returns to the local computer operating system at step 86.

If the user identification and password are verified by the remote computer at step 70, control passes to step 76 where a shared memory segment is created on the local computer. A shared memory segment, as known to those skilled in the art, is a portion of the local computer's memory configured to enable interchange of the data in the segment among application programs on the local computer. The security access client next preferably confirms at step 78 that the attempt to create a shared memory segment at step 76 was successful. If the segment could not be allocated, an error is issued at step 80 and control returns to the local computer operating system at step 86. If a shared memory segment was allocated at step 76, then the security access client preferably stores the now-verified user identification and password in the allocated shared memory segment on the local computer at step 82, and the user is notified of the verification. The APPC conversation with the remote computer is deallocated at step 84, and control returns to the local computer operating system at step 86.

Before accessing the remote data using the present invention, the user must identify the file attributes for each remote data file to be accessed. The file attributes necessary can vary depending upon the format of the file to be accessed and the operating system of the remote computer. For example, the file attributes for a remote file stored in a sequential or an indexed sequential format generally include the fully qualified name of the file. A remote output file must similarly have file attribute information stored. Depending upon the remote computer operating system, the file attributes for an output file could further include the file format, whether the record length is fixed or variable, whether the data is blocked, and if so, the block size, and other file definition information understood by those skilled in the art.

Since this information is preferably supplied in advance of running the application program accessing the remote data, a preferred embodiment of the present invention provides a convenient means for storing this information. For remote files having a sequential access or indexed sequential access format, the file attributes are preferably stored on the remote computer using a file attribute client program and a file attribute server program. The file attribute client program preferably resides on the local computer and the file attribute server program preferably resides on the remote computer.

Figure 3:
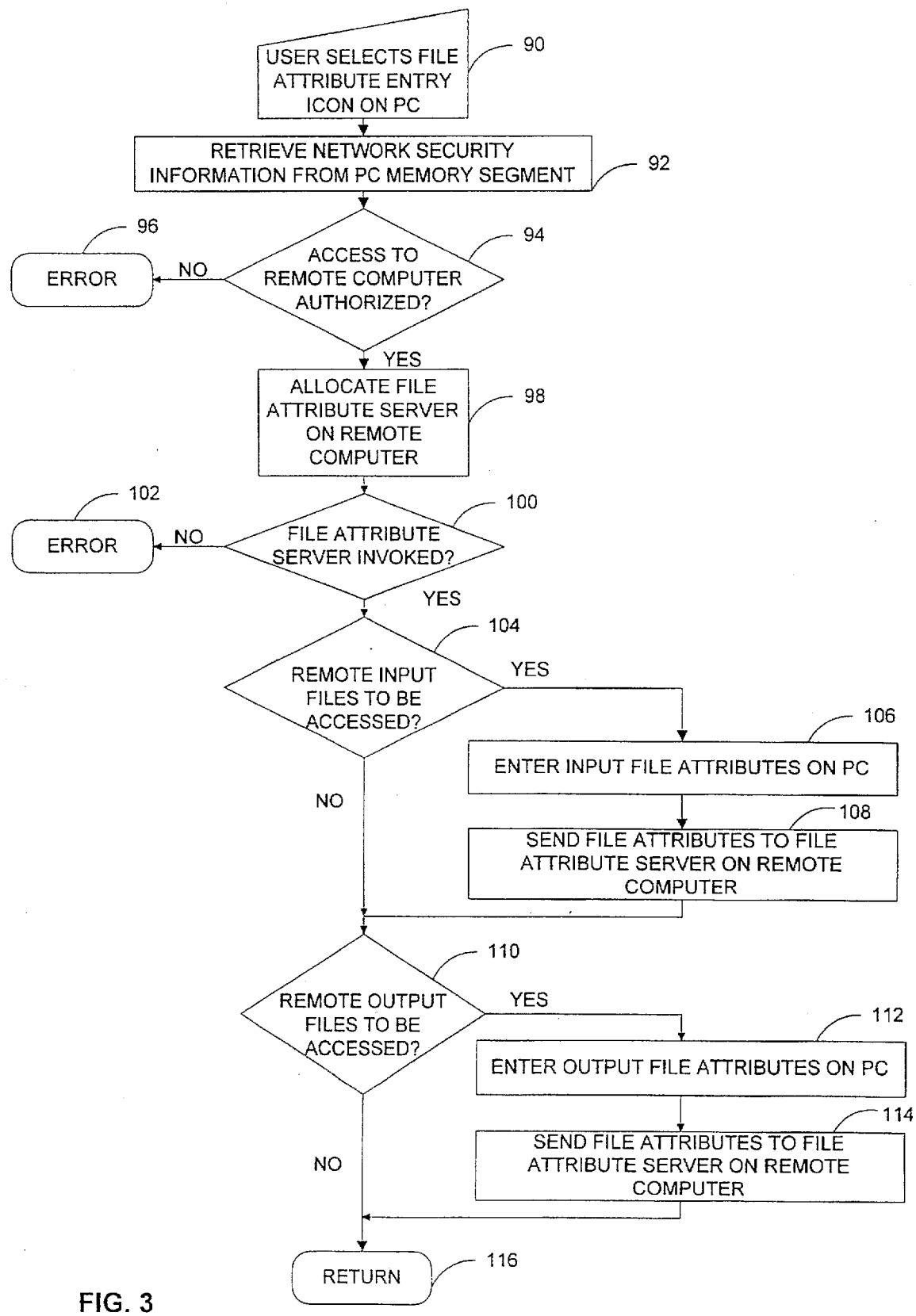
FIG. 3 is a flowchart of the file attribute client program for files having a sequential access or indexed sequential access format.

FIG. 3 is a flowchart overview of the file attribute client program for files having a sequential access or an indexed sequential access format. An iconic interface is preferably provided to enable the user to conveniently invoke the file attribute client of the invention. The user preferably begins at step 90 by selecting the file attribute entry icon on the local computer monitor. This invokes the file attribute client residing on the local computer which at step 92 begins by retrieving the previously stored network security information from the local computer shared memory segment. If authorized access to the remote computer was previously denied, then at step 94 control passes to step 96. An error message is issued, and further processing is halted. If access to the remote computer was previously authorized, the file attribute server on the remote computer is allocated at step 98, a process well-known to those skilled in the art. The file attribute client then preferably determines at step 100 whether the file attribute server was properly invoked. If the file attribute server was not properly invoked, an error message is issued at step 102, and further processing is halted. If the file attribute server was successfully invoked by the file attribute client, the file attribute client then is adapted to enable the user to enter the file attributes for each sequential or indexed sequential file to be accessed. If at step 104 a remote file is to be accessed for input, then at step 106 the user preferably enters the necessary file attribute information at the local computer. After the input file attribute information has been entered by the user, the file attribute client preferably transmits at step 108 the attributes to the file attribute server on the remote computer, which is further described in FIG. 4. Control then passes to step 110, whereupon the user can enter the file attributes for remote files to which the application program will direct output. If remote output files are to be accessed, control passes to step 112, and the user enters the output file attribute information. Upon completion of the output file attribute entry, the file attribute client preferably transmits at step 114 the output file attribute information to the file attribute server on the remote computer, and control returns to the operating system of the PC at step 116.

Figure 4:
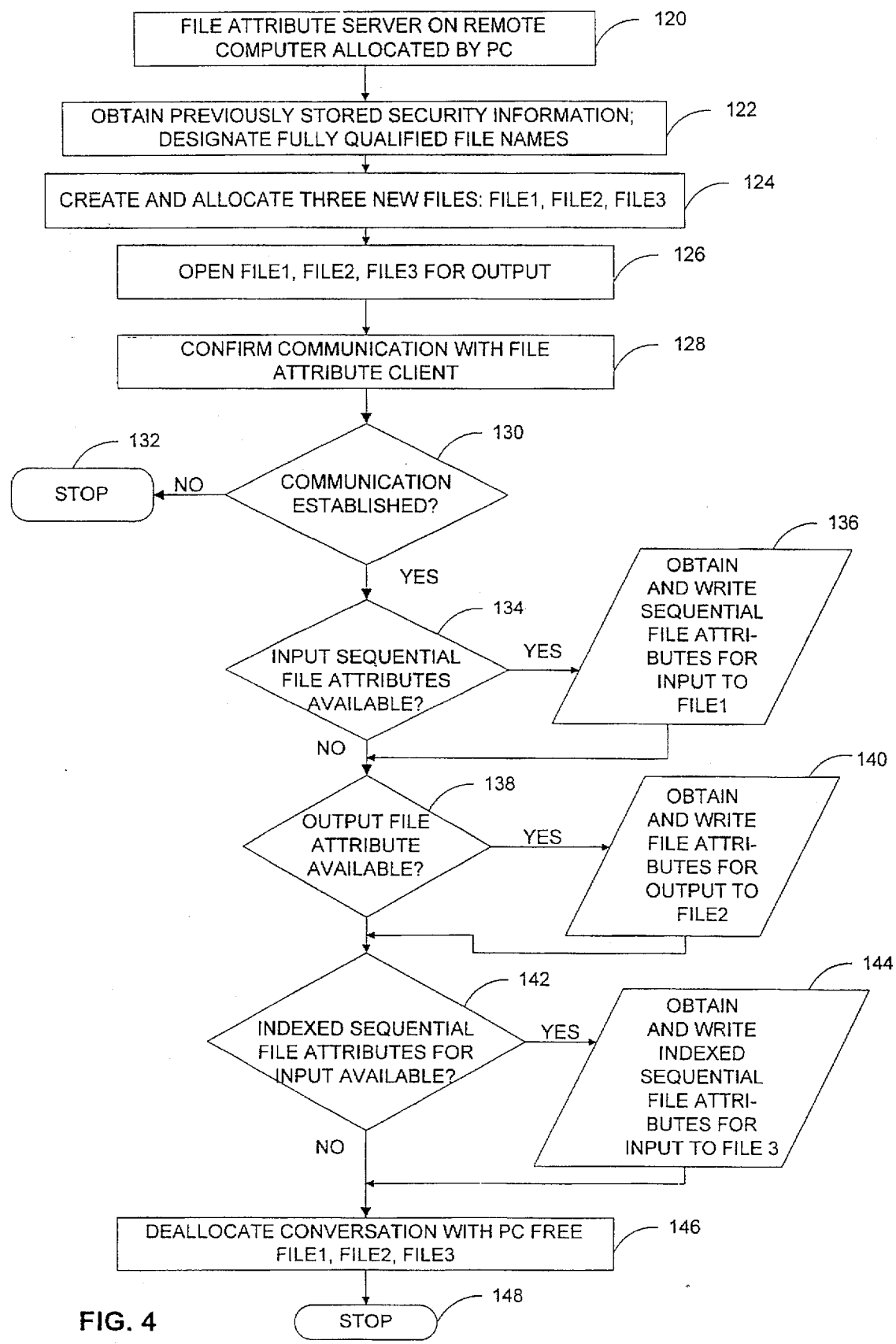
FIG. 4 is a flowchart of the file attribute server program for files having a sequential access or indexed sequential access format.

The file attribute server allocated in FIG. 3 is further described in FIG. 4. The file attribute server resides on the remote computer. Its primary purpose is to store on the remote computer the file attribute information entered by the user through use of the file attribute client program. After being allocated by the PC at step 120, the file attribute server at step 122 obtains from the file attribute client the previously stored remote computer security information to confirm an authorized access. At step 124, the file attribute server designates fully qualified file names for three files to be created on the remote computer. The fully qualified file naming convention can, of course, vary depending upon the remote computer's operating system. For example, the fully qualified file name under the well known IBM MVS operating system might consist of the user's security identification followed by the file name. The security identification code might be "B1234" and the file could be called "FILE1". The fully qualified file name therefore would be "B1234.FILE1". Such a naming convention also provides a convenient way for locating the pertinent files associated with a particular user. At step 124, the file attribute server creates and allocates three new files, designated herein as FILE1, FILE2 and FILE3. These file names are shown merely by way of example and do not in any way limit the range of permissible file names, which in practice could well differ. FILE1, FILE2, and FILE3 are then opened for output at step 126, and communication with the file attribute client is confirmed at step 128. The server verifies communication with the client at step 130. Absent such verification, further processing is halted at step 132. If communication was confirmed with the local computer at step 130, the file attribute server then determines whether input file attributes are available for sequential access format files at step 134. If not, control passes to step 138. If so, control passes to step 136, whereupon the server obtains and writes to FILE1 the sequential file attributes supplied by the file attribute client. Control then passes to step 138 whereupon the server determines whether file attribute information is available for output files. If not, control passes to step 142. If so, the file attribute server obtains the file attribute information for output files from the file attribute client at step 140 and writes these file attributes to FILE2. The file attribute server is further preferably adapted to allocate any output files for processing that have not yet been created.

Control then passes to step 142 whereupon the file attribute server determines whether file attributes for any indexed sequential files for input are available from the file attribute client. If not, control passes to step 146. If such file attributes are available, control passes to step 144 whereupon the file attribute server obtains from the file attribute client the file attributes of indexed sequential files to be accessed for input and writes this information to FILE3. Control then passes to step 146 where the conversation with the local computer is deallocated, as known to those skilled in the art. Furthermore, FILE1, FILE2 and FILE3 are released for later use. Thereupon, control passes to step 148, where the file attribute server terminates execution.

The file attribute entry system for Information Management System (IMS) files differs from that for sequential or indexed sequential access files. As known to those skilled in the art, an application program must generally use IMS calling conventions and functions to access files stored in the IMS format. Furthermore, accessing files having the IMS format requires that file attribute information be provided that differs from that for sequential or indexed sequential access files. In the preferred embodiment, the user begins by downloading to the local computer the mainframe version of the Data Base Description (DBD) for the IMS file to be accessed using conventional communication software, such as the Communication Manager running under the operating system OS/2. Such a download can usually be accomplished in a short time period since the DBD files typically comprise less than 40 kilobytes. Similarly, the user must generally download the corresponding Program Specification Block (PSB) file from the remote system containing the IMS file to be accessed. Such PSB files are typically less than 5 kilobytes and can be transferred from the remote computer containing the IMS files to the local computer using similar communication software. After the DBD and PSB files have been downloaded to the local computer, the conventional operation of "generating" the DBD and PSB, known as DBDGEN and PSBGEN respectively, are performed using conventional software, such as the Stingray software package. After the DBDGEN and PSBGEN operations have been performed, the invention then further processes the DBD and PSB information to enable remote access of IMS files.

The invention contemplates storing IMS file attributes for accessing a desired remote IMS file on a predesignated computer. In order to enter the necessary information to access remote IMS files, the invention at FIG. 5 preferably begins by having the user at step 160 select an IMS initialization icon on the local computer monitor. Thereupon, at step 162, as will be appreciated by those skilled in the art, a previously generated DBD table is loaded into the local computer memory. The IMS file initialization at step 164 continues by allocating a session with the remote IMS data access server (see FIG. 13) and by sending a test message to confirm proper allocation. If at step 166 the test message does not return properly, control passes to step 168 signifying an error has occurred, and further processing is halted. If the test message at step 166 is received properly, control passes to step 170, wherein a program data structure for sending IMS-related messages is initialized for the APPC protocol. The structure should be one capable of containing IMS-related messages or commands. Thereupon control passes to step 172 where, as will be appreciated by those skilled in the art, a "semaphore" or indicator in memory is set on the local computer. Control for this aspect of the invention pauses at this point until a command clearing the semaphore is received from a cooperating application program at step 174. When the semaphore is cleared, typically by another aspect of the invention, control passes to step 176, which determines whether an "END" request has been received directing the invention to terminate IMS services. If not, control passes to step 178 for processing of the IMS file request, whereupon control loops back to step 172, setting the semaphore and awaiting the next IMS command.

If at step 176 an "END" request has been received from the user or the application, control passes to step 180 whereupon a deallocate request is sent to the data access server for IMS files. Control then passes to step 182, where the necessary file and other resources are released for further use. At step 184, control returns to the local computer operating system.

Figure 5:
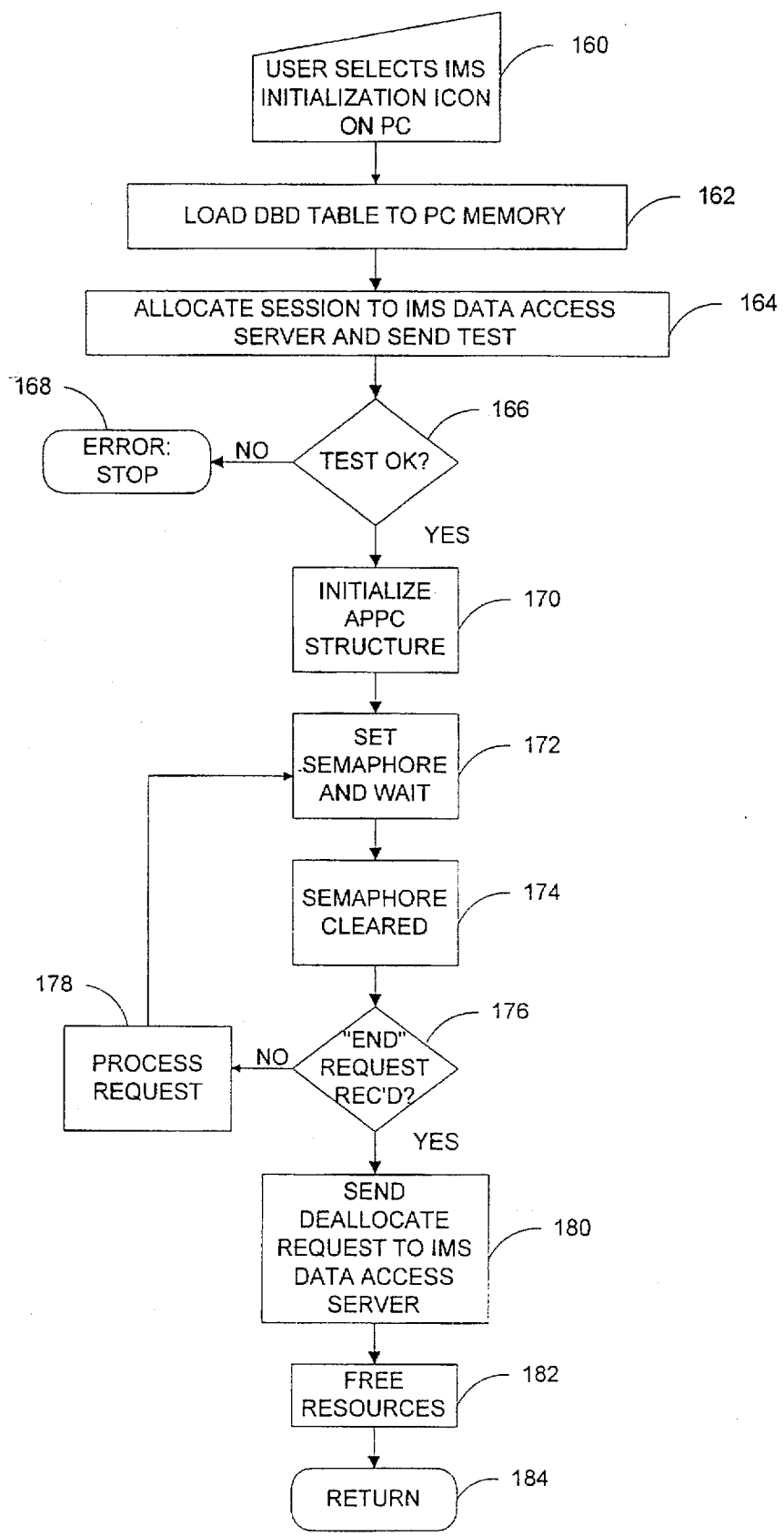
FIG. 5 is a flowchart of the portion of the invention that initializes the remote computer for accessing remote data stored in the IMS format.
Figure 6:
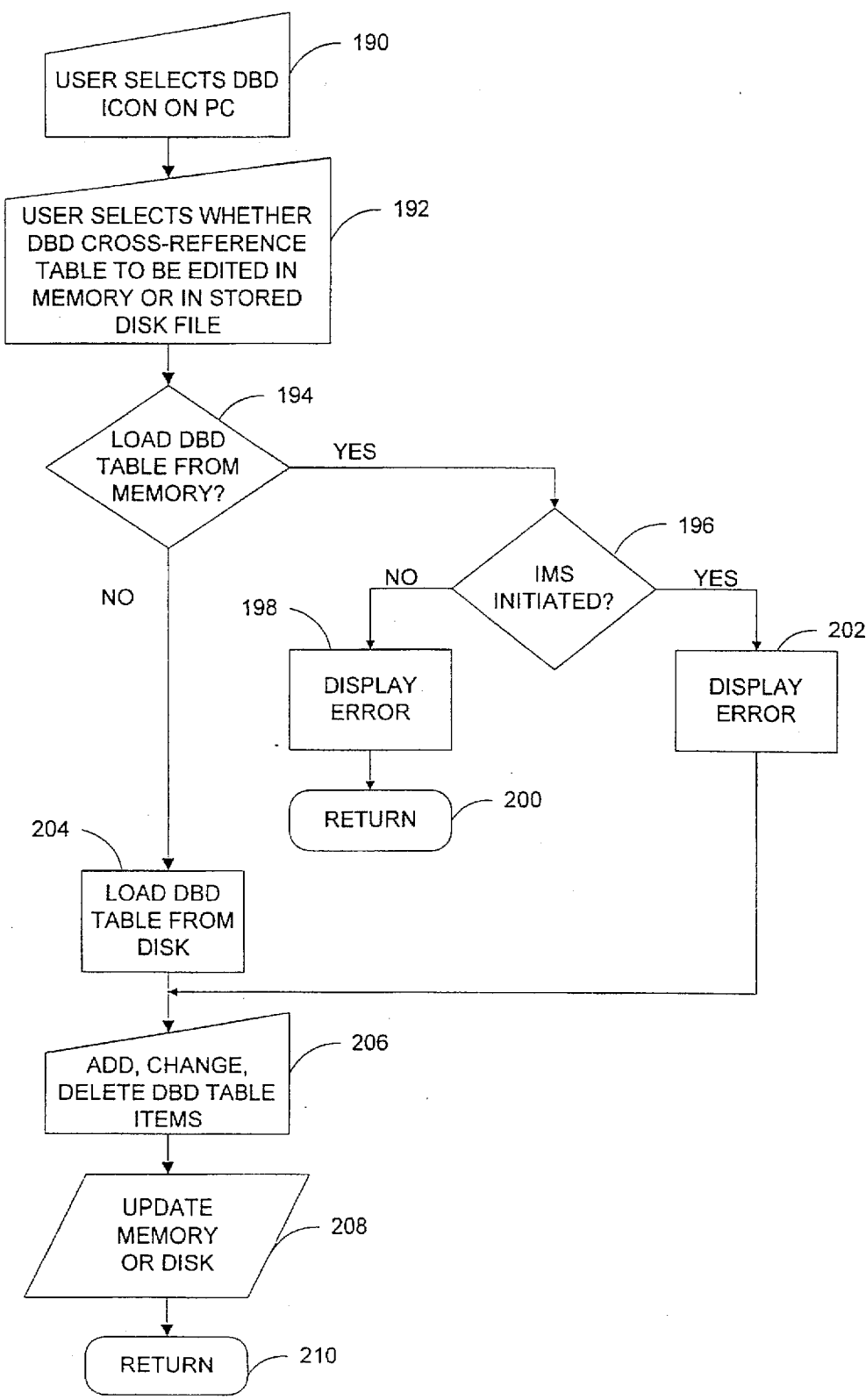
FIG. 6 is a flowchart of the portion of the invention for storing DBD file attributes for IMS format files.

A user will generally wish to direct the IMS data access portion of the invention to utilize a particular DBD or PCB. Accordingly, FIG. 6 illustrates the file attribute entry feature of the invention for IMS files. This aspect of the invention utilizes the previously created DBDGEN information and operates to cross-reference or "map" the DBD information on the local computer to the DBD, PSB, or PCB information on the remote computer. This feature of the invention begins at step 190 preferably by having the user select the DBD map icon on the local computer. Control then passes to step 192, and the user selects whether the DBD cross-reference table to be edited is currently stored in memory or instead is stored in a disk file. At step 194, the invention determines from the user whether the DBD cross-reference must be loaded from memory. If so, control passes to step 196 and determines whether the IMS system on the remote computer has been initiated, preferably in accordance with the features of the invention illustrated in FIG. 5. If the IMS system has not been initiated, control passes to step 198 and displays an error message to the user. At step 200, control thereafter returns to the local computer operating system, and further processing is halted. If at step 196, the invention detects that IMS has been initiated, then at step 202, the DBD cross-reference table is loaded into an editing structure from memory.

If at step 194 the DBD cross-reference table is not to be loaded from memory, control passes to step 204 to enable the DBD cross-reference table to be loaded from a disk file. Thereupon, control passes to step 206, and the user can add, change, delete, or modify items in the DBD cross-reference table to establish the appropriate cross-references to the remote IMS file to be accessed. When the user has completed this step, control passes to step 208, and the memory or the disk file is updated in accordance with the user's changes. Thereupon control passes to step 210, which returns control to the local computer operating system.

Figure 7:
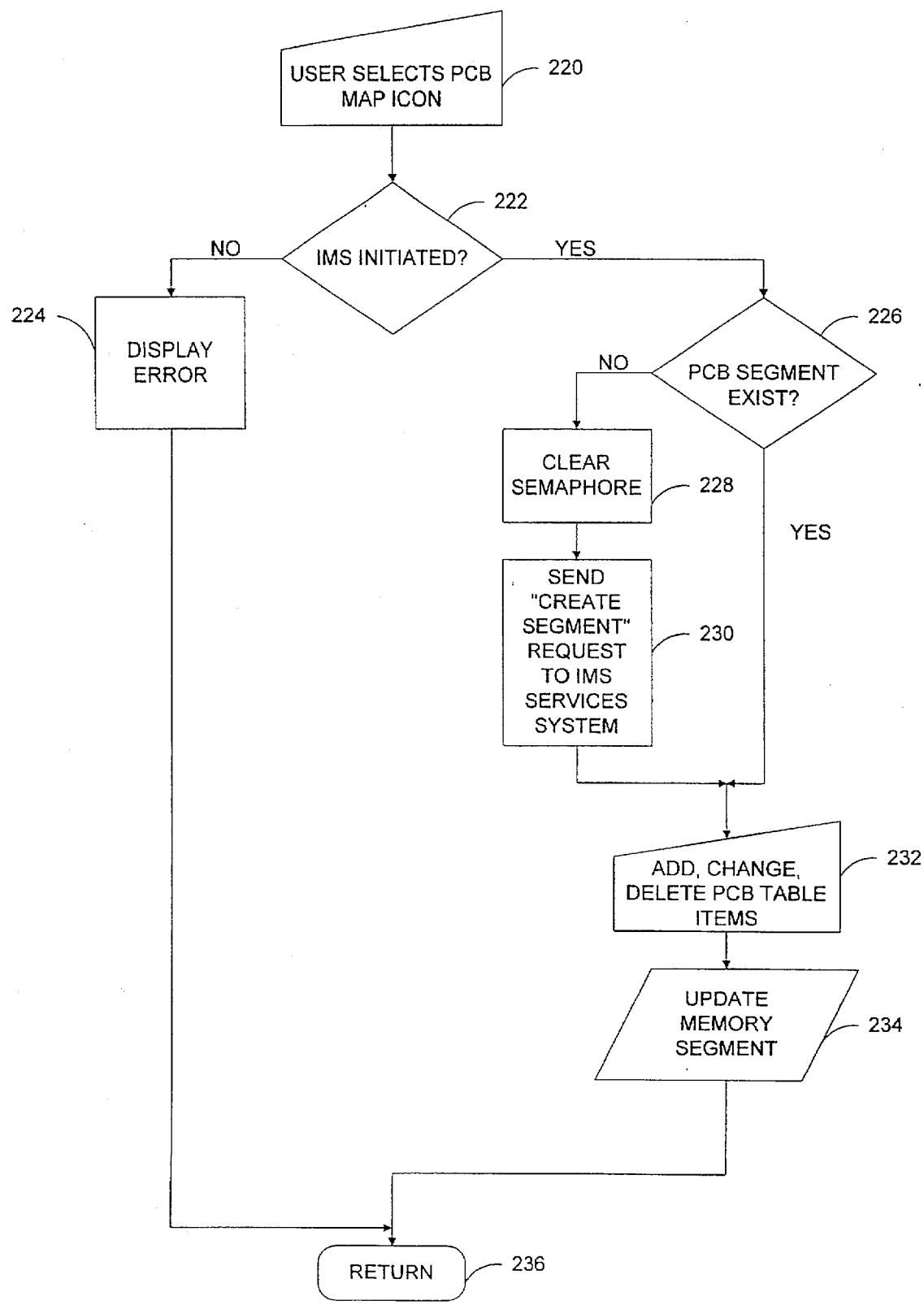
FIG. 7 is a flowchart of the portion of the invention for storing PCB file attributes for IMS format files.

As noted above, accessing an IMS format file generally requires the use of a Program Control Block or PCB. Under the present invention, the PCB information is downloaded to the local computer from the remote computer containing the IMS file to be remotely accessed. As illustrated in FIG. 7, the invention preferably provides a convenient means for establishing a desired cross-reference between the PCB information on the local computer and the PCB corresponding to the DBD to be accessed on the remote computer. To utilize this feature of the invention, the user preferably begins by selecting the PCB map icon at step 220. Control then passes to step 222, whereupon it is determined whether the IMS system has been previously initiated, as shown at FIG. 5. If not, control passes to step 224. An error is displayed to the user, and at step 236 control returns to the operating system of the local computer. If it is detected at step 222 that the IMS system has been initiated, the invention determines whether the desired PCB segment currently exists at step 226. The invention determines this information based on the PSBs stored on the local computer. If not, control passes to step 228, and the semaphore is cleared inducing further processing in the IMS file initialization portion of the invention illustrated in FIG. 5. A "create segment" request, known to those skilled in the art, is sent to the IMS processor on the remote computer at step 230, and the desired new PCB segment is created on the remote computer. Thereupon, control passes to step 232, enabling the user to add, change, delete or otherwise modify items in the PCB table, further illustrated at FIG. 16. After the desired modifications have been completed for the PCB table, the memory segment containing the PCB information is updated at step 234, and control returns to the operating system of the local computer at step 236.

Figure 8:
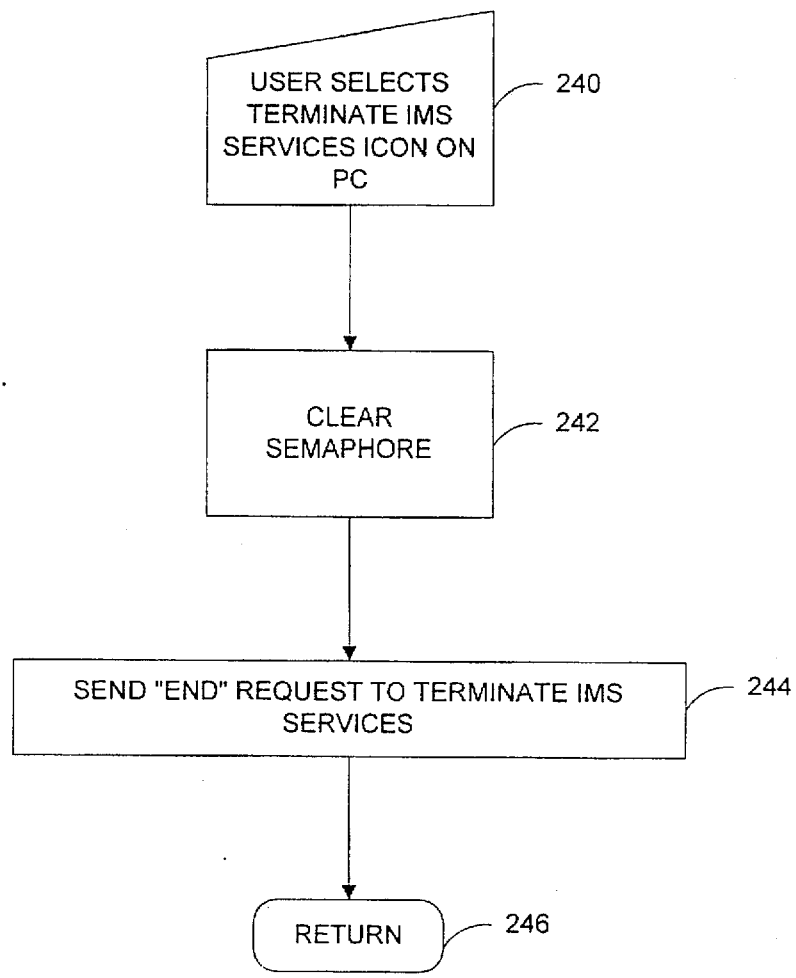
FIG. 8 is a flowchart of the portion of the invention terminating access to remote data stored in the IMS format.

After the desired IMS processing has been completed, the invention preferably provides a means for an orderly termination of IMS services on the remote computer. This aspect of the invention, shown in FIG. 8, preferably resides on the local computer and may be invoked by enabling the user to select an icon terminating IMS services at step 240. Thereupon at step 242, the semaphore is cleared as discussed above in conjunction with FIG. 5, and an "END" request is sent to the remote computer to terminate IMS services at step 244. IMS services are terminated, and at step 246, control returns to the local computer operating system.

Figure 9A:
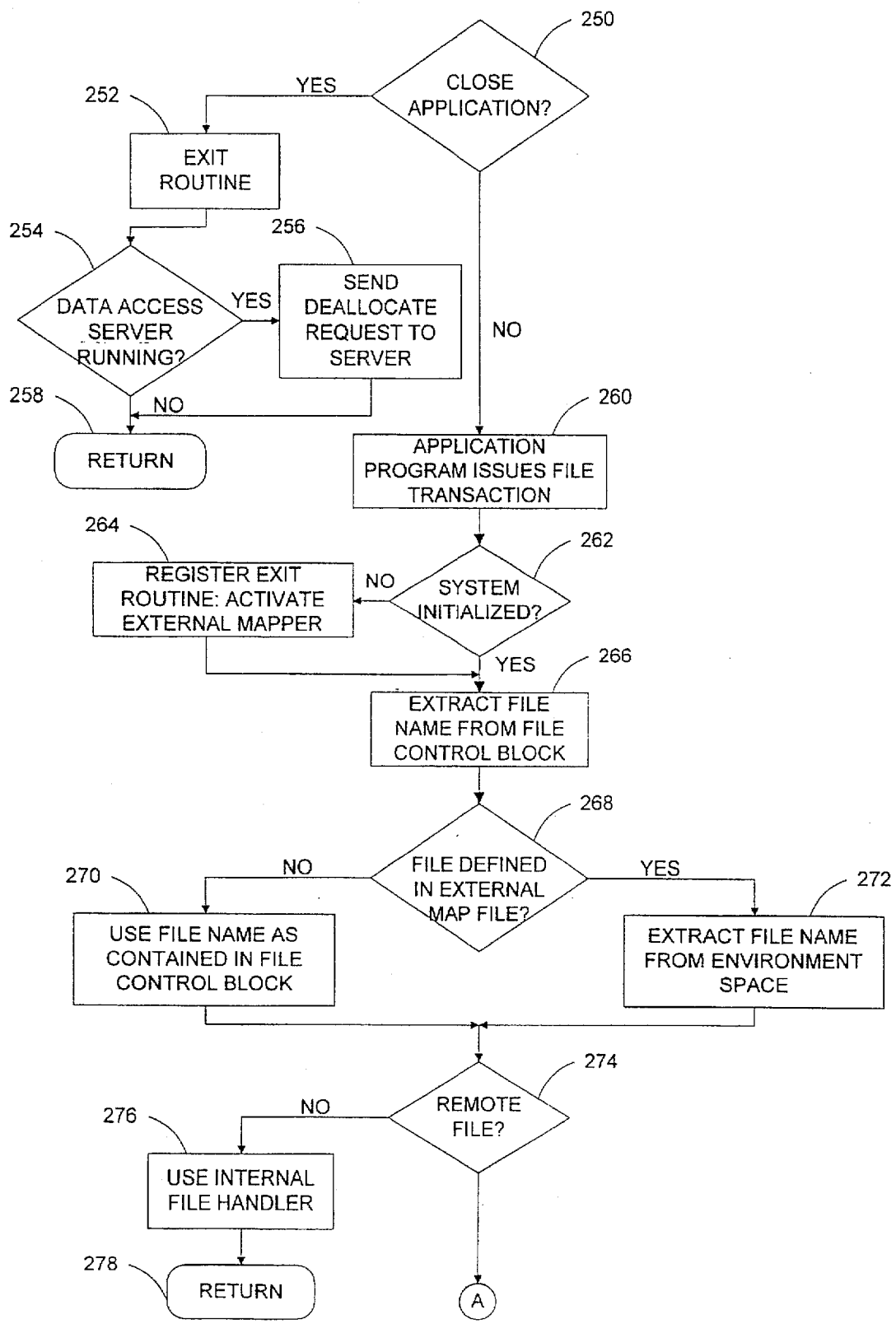
FIGS. 9A and 9B is a flowchart of the data access client program for files having a sequential or an indexed sequential access format.
Figure 9B:
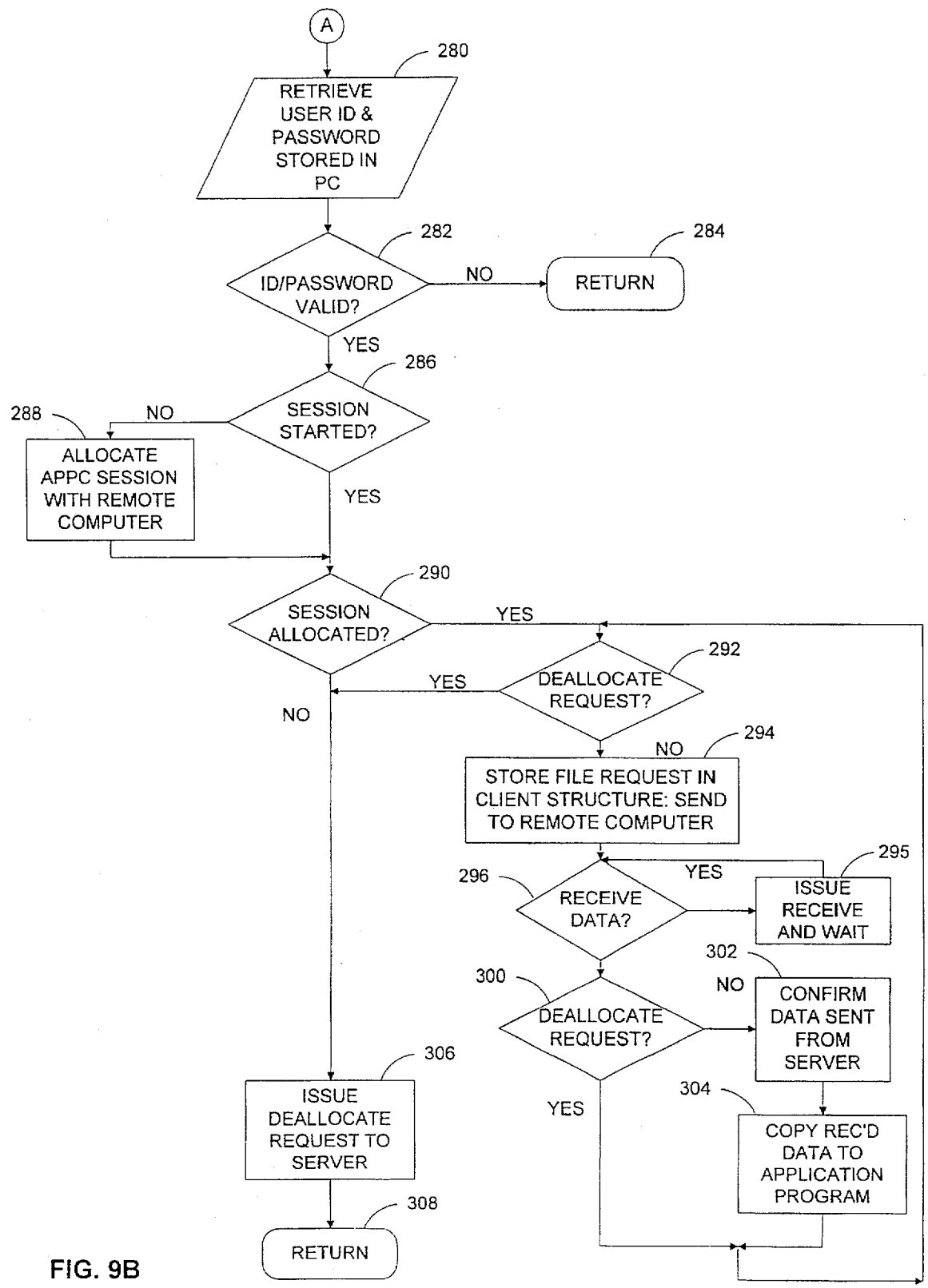

FIGS. 9A and 9B are a flowchart of the data access client program of the invention for accessing remote files having a sequential access, indexed sequential access or similar format. As noted above, the data access client preferably resides on the local computer in the form of a dynamic-link library (DLL). The data access server begins at step 250 by determining whether the application program has terminated. If so, control passes to step 252, where the necessary steps, which will be appreciated by those skilled in the art, are carried out to effect an orderly exit. At step 254, the data access client determines whether the data access server program is running. If so, at step 256 a deallocate request is sent to the data access server, and control is returned to the local computer operating system at step 258.

If at step 250 the application is not being closed, control passes to step 260, and the application program executes a file transaction, such as one associated with a READ or a WRITE statement. At step 262, the data access client checks generally to determine that the remote and local systems have been properly initialized. If the system has not been fully initialized, initialization steps are performed at step 264 that include registering an exit routine using the APPC protocol, as is known to those skilled in the art, and activating the external mapper feature available under application development systems, such as the product Micro Focus Programmer's Workbench. After the system is properly initialized, the data access client at step 266 extracts the file name from the file control block passed to it by the application program. Working together, the application development system and the data access client then determine at step 268 whether the file is referenced in the previously created map file. If not, control passes to step 270, and the data access client program uses the file name as contained in the file control block. If at step 268 the file name in the file control block is referenced in the map file, control passes to step 272 wherein the fully qualified name for the file is extracted from the storage location containing the external map file information. Control then passes to step 274, at which point the data access client is adapted to determine whether the file to be accessed by the application program is a remote file. If not, control passes to step 276, and the conventional internal file handler of the application development system is utilized to access the desired file. At step 278, control returns to the local computer operating system.

If at step 274 it is determined that a remote file is to be accessed, control passes to step 280, and the user identification and password previously stored on the PC are obtained. If the user identification and password are determined to be invalid at step 282, step 284 returns control to the local computer operating system.

If the user identification and password were found to be valid, control passes from step 282 to step 286. The data access client then determines at step 286 whether an APPC session exists with the data access server. If not, at step 288 the data access client preferably allocates an APPC session with the remote computer. Control then passes to step 290, where the data access client verifies that a session was properly allocated with the data access server. If the session was not properly allocated, control passes to step 306, and the data access client issues a deallocate request to the remote server and, at step 308, control returns to the local computer operating system.

If at step 290, control determines that a session was properly allocated with the data access server, control passes from step 290 to step 292 to determine whether the application program has issued a deallocate request. If so, control passes to step 306 and proceeds as described above.

If no deallocate request has been issued by the application program at step 292, control passes to step 294. The file transaction request from the application program is stored in a data client structure corresponding to the access format to be employed and the data to be obtained, as will be understood by those skilled in the art. The file transaction request is then sent to the file access server on the remote computer along with any necessary file designator information. Control passes to step 296 where the file access client waits to determine whether the data has been received at step 298. If the data is not so received, control passes to step 300 to determine whether a deallocate request has been issued. If so, control passes back to step 292 and to step 306 for termination processing. At step 308, control returns to the local computer operating system. If at step 300 no deallocate request has been received, the file access client preferably confirms that the data were sent from the file access server at step 302. The data received by the client are then at step 304 copied to the application program for its further processing. Control then preferably loops back to step 292 to determine whether a deallocate request has been received and to await further remote data requests.

Figure 10A:
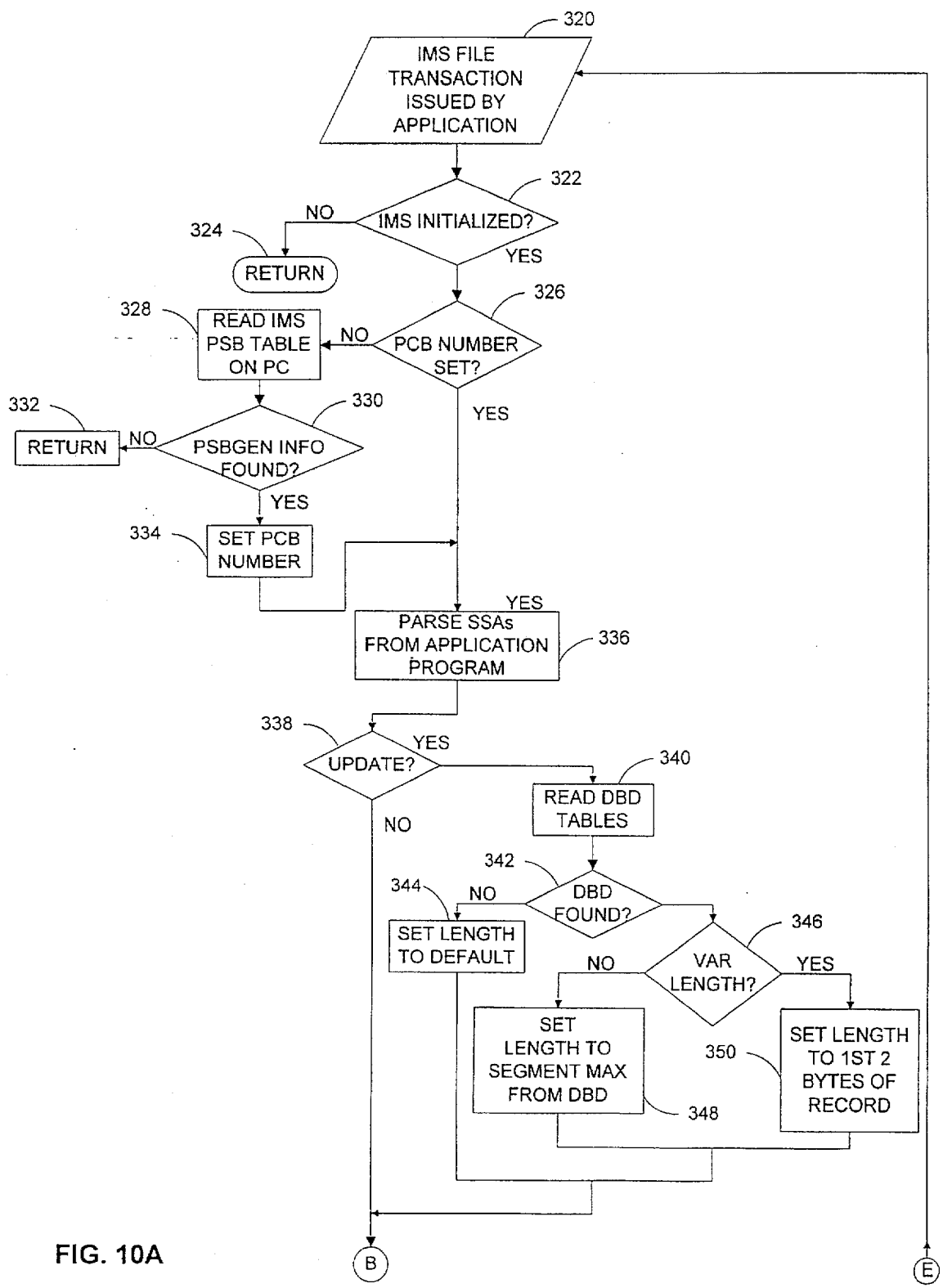
FIGS. 10A and 10B are a flowchart of the data access client program for files having the IMS format.
Figure 10B:
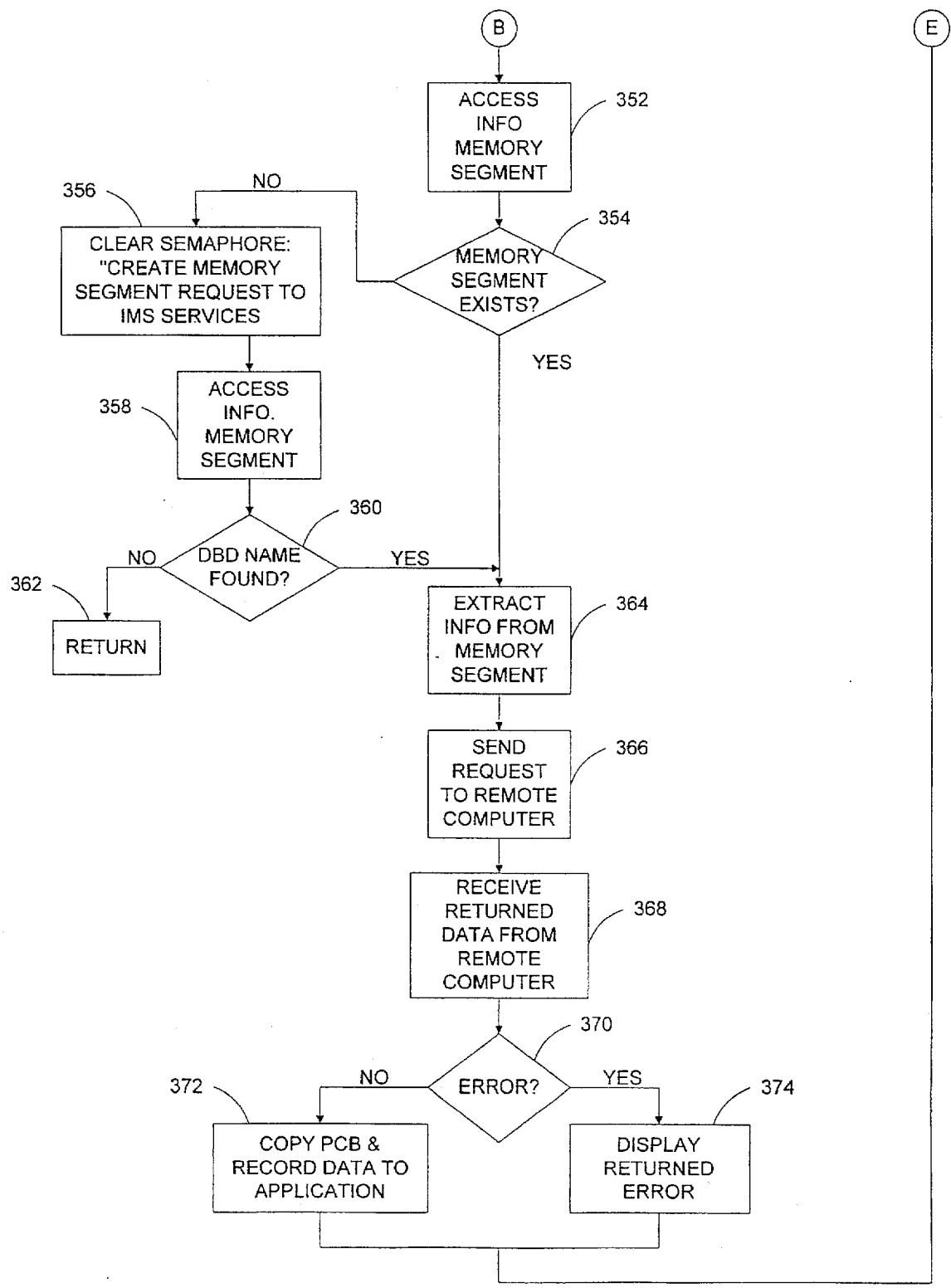

FIGS. 10A and 10B are a flowchart of the data access client for IMS files. The IMS data access client resides on the local computer and communicates with the IMS data access server on the remote computer. At step 320, the application program on the local computer issues a file access transaction to the IMS system. The data access client then confirms that the IMS system has been initialized at step 322, as earlier discussed in connection with FIG. 5. If the IMS system has not been so initialized, control passes to step 324, indicating an error and a halt of further processing. If at step 322 the data access client detects that the IMS system was properly initialized, control passes to step 326 to determine whether the number of the PCB in a particular PSB to be used has been set, as will be understood by those skilled in the art. If the PCB number has not been set, control passes to step 328, and the data access client reads the IMS PSBGEN information stored on the local computer. If the PSBGEN information is not found at step 330, control passes to step 332 indicating an error, and control is returned to the local computer operating system. If at step 330, the PSBGEN information is found, control passes to step 334 to enable the user to select the number of the PCB in the given PSB to be used. Control then passes to step 336. The Segment Search Argument or SSA is a convention well known to those familiar with the IMS file format. The SSA is generally a textual string containing the fields and search criteria to be applied for a given query. A function code is typically contained in the SSA indicating the operation to be performed on the data base such as a search, delete or update operation. The data access client parses the SSA at step 336 to extract the necessary information to conduct a desired operation. If at step 338 the function code indicates that an update is to be performed, the data access client next attempts at step 340 to read the previously stored DBD cross-reference table. To optimize the communication procedures, the maximum length of a particular segment is defined. This contributes to the efficiency in sending information across the communication link. If at step 342 the DBD could not be found, control passes to 344 to set the segment length to a predetermined default value, such as 2048 bytes. If, on the other hand, at step 342 the DBD name is found in the DBD cross-reference table, control passes to step 346 to determine whether the segment has a variable length. If not, the length of the segment is set at step 348 to the segment maximum based on the DBD cross-reference table. However, if the segment is of variable length, control passes to step 350, and the segment maximum length is set to the number stored in the first two bytes of the variable length record. If at step 338, on the other hand, control determines that an update is not required, or following steps 344, 348 or 350, control passes to step 352.

Control then accesses IMS-related information, such as the file attributes, stored in a memory segment at step 352. If at step 354, it is determined that the memory segment does not exist, control passes to 356. The semaphore is cleared, and a "create memory segment" request is sent to IMS services, discussed above in conjunction with FIG. 5. At step 358, the data access client then searches the DBD and PCB cross-reference information on the local computer for the name of the PCB to be utilized in conjunction with the search specified in the SSA. If the DBD name is not found at step 360, an error message is issued at step 362, and control returns to the local computer operating system. If at step 360 the DBD name is found, control passes to step 364 where the necessary IMS information is extracted from the created memory segment. If, on the other hand, the memory segment is found to exist at step 354, control passes directly to step 364. At step 366, a file transaction request is formulated and sent to the data access server on the remote computer. The data access server processes the request as further shown in FIG. 13. Upon completion of processing, returned data is sent from the remote computer to the local computer at step 368. If control determines at step 370 that an error occurred in processing, the error so returned is displayed for the user at step 374. If, on the other hand, no error occurred, the PCB and data information are copied to the application at step 372. Control then returns to 320 for further processing of IMS file transactions issued by the application program.

Figure 11A:
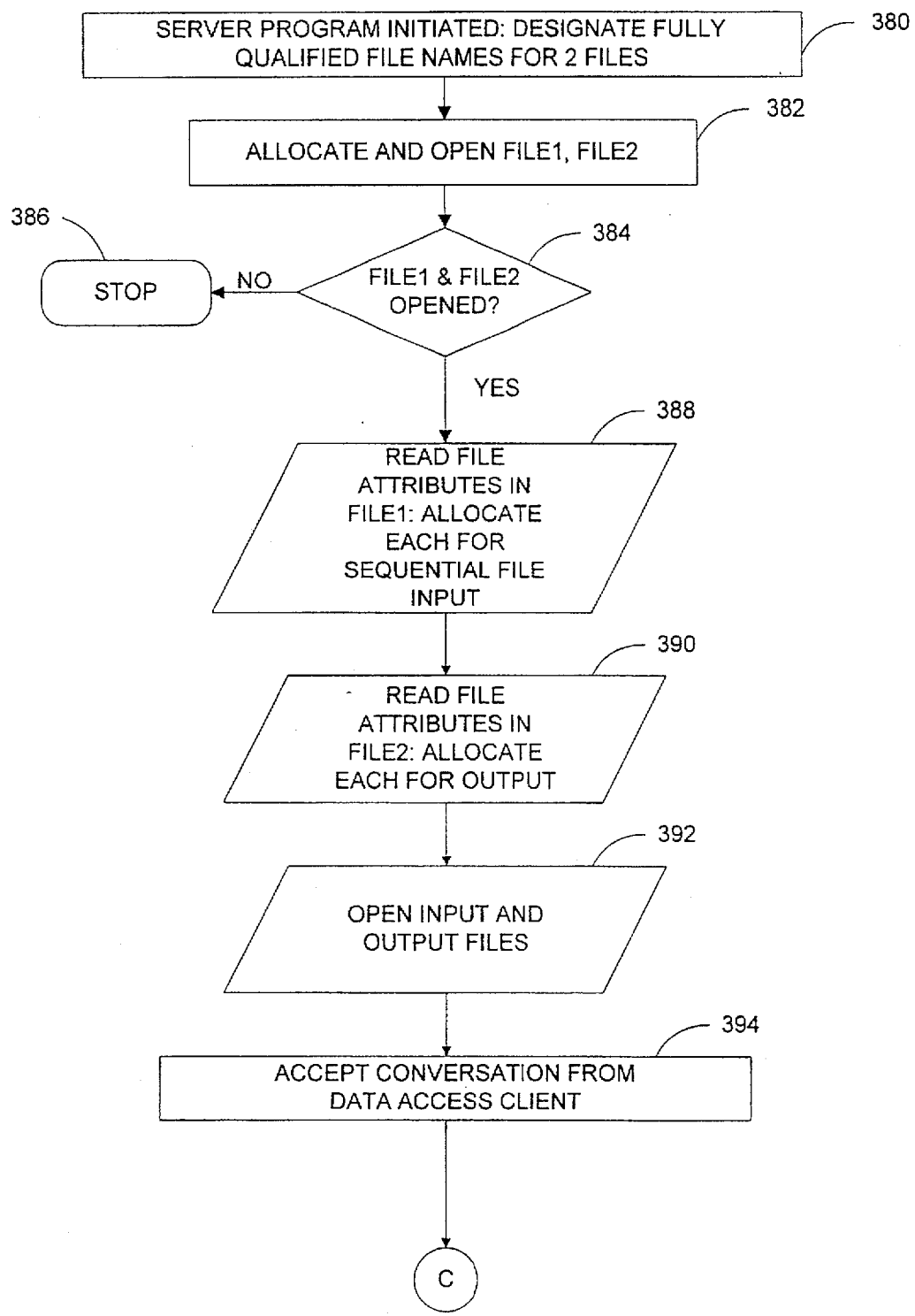
FIGS. 11A and 11B are a flowchart of the data access server program for files having a sequential access format.
Figure 11B:
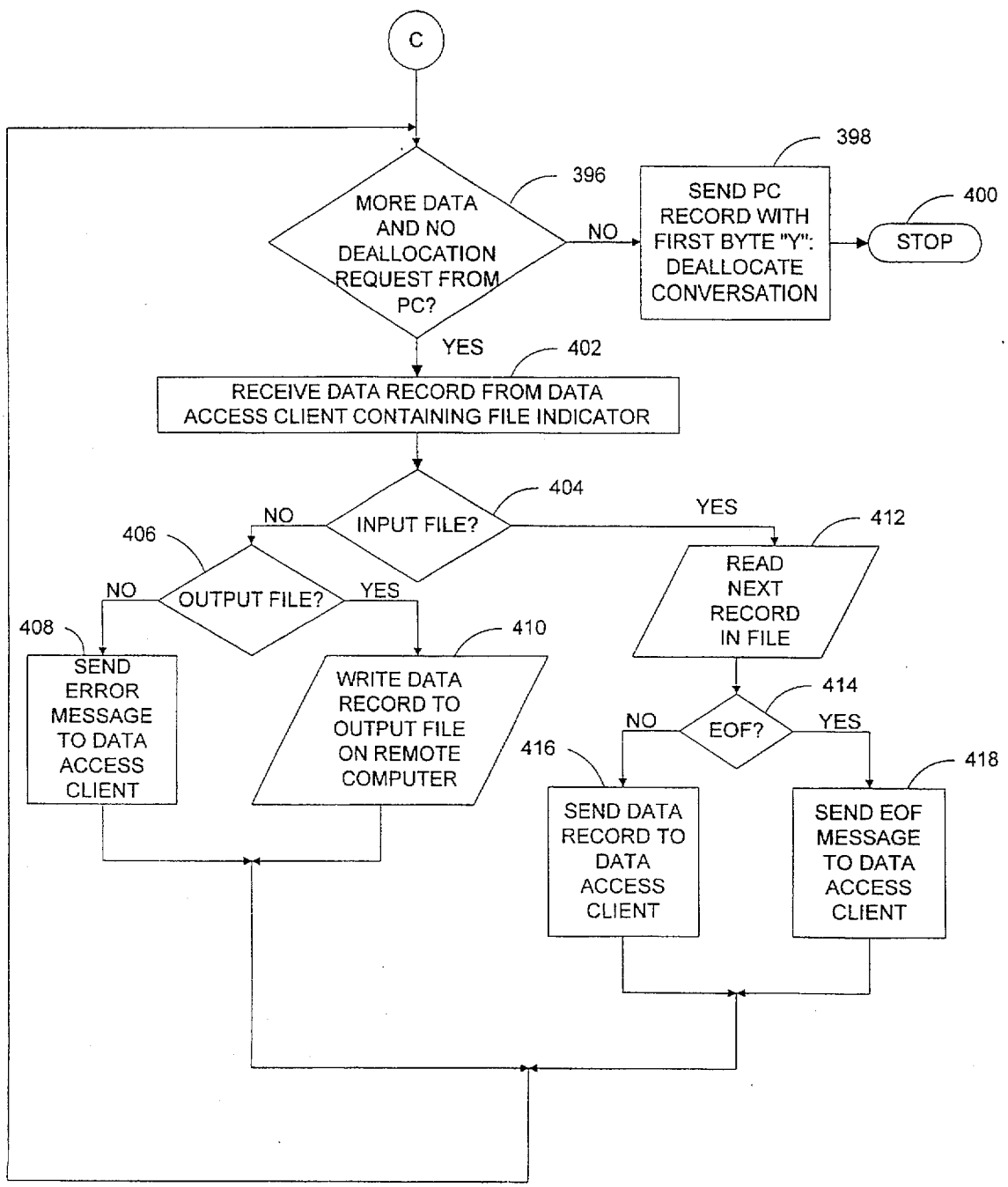

Communicating with the sequential file data access client is the data access server program for accessing sequential files illustrated in FIGS. 11A and 11B. This server program resides on the remote computer. At step 380, the server program is initiated preferably by the data access client program. The server then designates fully qualified file names for two files. As discussed above, the fully qualified file name could be the user's identification coupled with the strings "FILE1" or "FILE2" in a way appropriate under the given operating system of the remote computer. Thereafter, at step 382, the data access server for sequential files allocates and opens FILE1 and FILE2, and at step 384 confirms that FILE1 and FILE2 were properly opened. If not, at step 386 further processing is halted. If FILE1 and FILE2 were properly opened, the data access server at step 388 reads the file attributes for each input file stored previously in FILE1. The data access server then allocates each of the files whose file attributes were stored in FILE1 for sequential file input using the necessary commands under the remote computer's operating system. At step 390, the data access server reads the file attributes for each output file previously stored in FILE2. The data access server allocates each such file for output using the necessary commands under the remote computer's operating system. The data access server opens the allocated input and output files at step 392. At step 394, as will be understood by those skilled in the art, the data access server preferably accepts an APPC conversation from the sequential file data access client program discussed above. Control then passes to step 396, where the data access server determines whether there are more data and whether a deallocation request has been issued from the local computer. If at step 396 there are no more data and a deallocation request has been received from the local computer, control passes to step 398. At this point, a message is sent to the local computer, such as a "Y" in the first byte of a record, and the conversation with the server is deallocated. At step 400, further processing is halted.

If at step 396 there are additional data or no deallocation request has been received from the local computer, control passes to step 402 where the data access server receives the data record containing a file indicator from the data access client for further processing. The indicator communicates whether a given file is intended for input or output. At step 404, the data access server determines whether the file transaction is to be performed on an input file. If so, control passes to step 412, and the server reads the next record in the given input file. When the end of the input file is detected at step 414, an end of file message is sent to the data access client at step 418, and control loops to step 396 for further iterative processing. If at step 414, the end of file has not been reached, control passes to step 416 whereupon the data retrieved at step 412 is returned to the data access client, and control passes to step 396.

If at step 404, the file transaction issued does not concern an input file, control passes to step 406 and determines whether the file transaction involves outputting information to a remote file. If so, control passes to step 410, and the desired information is written to the output file on the remote computer. Control then loops back to step 396. If at step 406 the file transaction concerns a file that is not designated for either output or sequential access input, an error message is sent to the file access client at step 408, and control loops back to step 396.

Figure 12A:
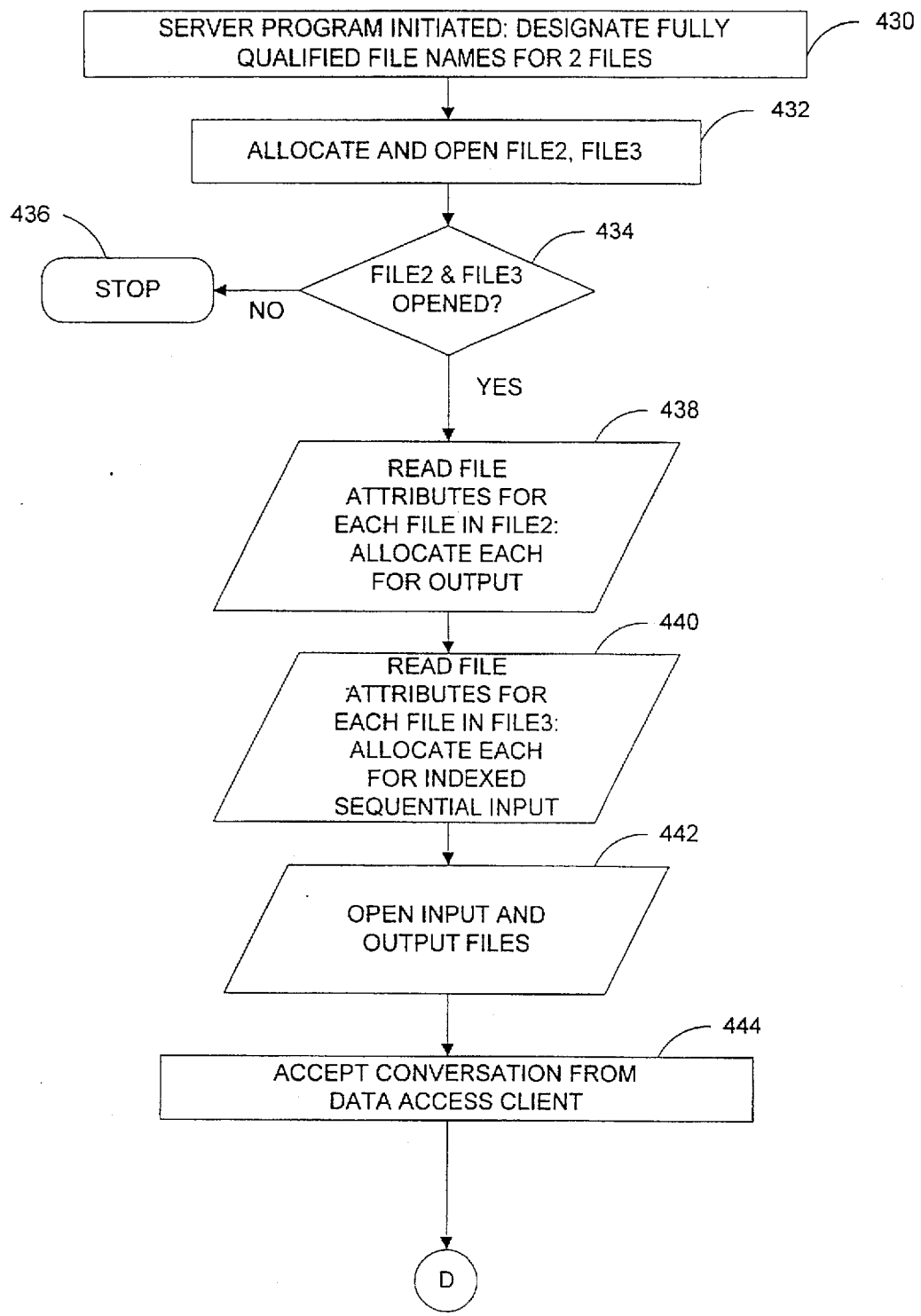
FIGS. 12A and 12B are a flowchart of the data access server program for files having an indexed sequential format.
Figure 12B:
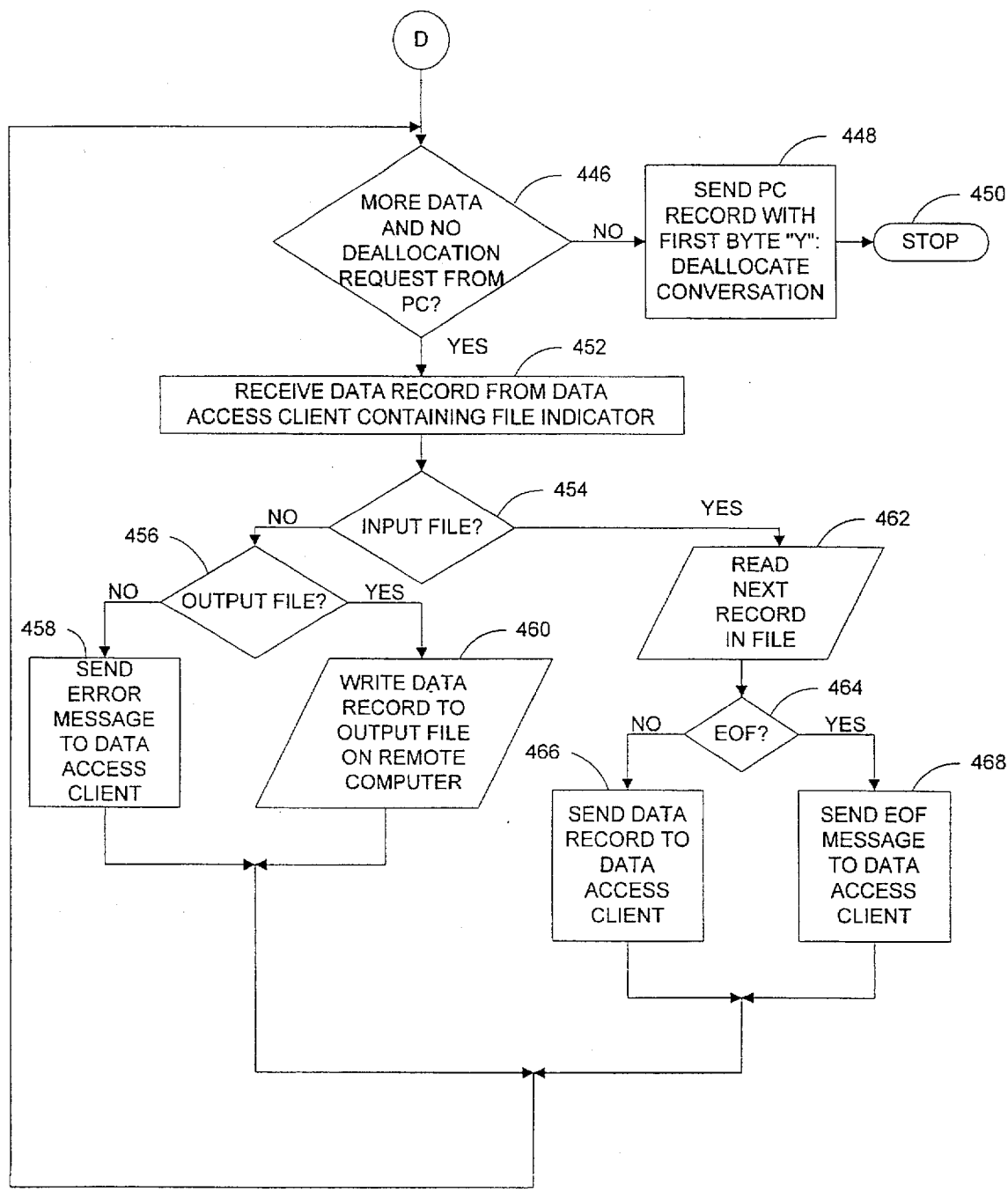

FIGS. 12A and 12B illustrate the data access server program of the invention for indexed sequential files. As can been seen, it is similar to the data access server program for sequential files. At step 430, the server program is initiated preferably by the data access client program. The server then designates fully qualified file names for two files. As discussed above, the fully qualified file name could be the user's identification coupled with the names FILE2 or FILE3 in a way appropriate under the given operating system of the remote computer. Thereafter, at step 432, the data access server for indexed sequential files allocates and opens FILE2 and FILE3, and at step 434 confirms that FILE2 and FILE3 were properly opened. If not, further processing is halted at step 436. If FILE2 and FILE3 were properly opened, the data access server at step 438 reads the file attributes for each output file stored previously in FILE2. The data access server then allocates each of the files whose file attributes were stored in FILE2 for output using the necessary commands under the remote computer's operating system. At step 440, the data access server reads the file attributes for each indexed sequential access file previously stored in FILE3. The data access server allocates each such file for input using the necessary commands under the remote computer's operating system. The data access server opens the allocated input and output files at step 442. At step 444, as will be understood by those skilled in the art, the data access server preferably accepts an APPC conversation from the data access client program discussed above in FIG. 3. Control then passes to step 446 where the data access server determines whether there are more data to be processed and whether a deallocation request has been issued from the local computer. If at step 446 there are no more data and a deallocation request has been received from the local computer, control passes to step 448. At this point, a message is sent to the local computer, such as a "Y" in the first byte of a record, indicating termination of processing and deallocation of the conversation with the server. At step 450, further processing is halted.

If at step 446 there are additional data or no deallocation request has been received from the local computer, control passes to step 452 where the data access server receives the data record containing a file indicator from the data access client for further processing. The indicator communicates whether a given file is intended for input or output. At step 454, the data access server determines whether the file transaction is to be performed on an input file. If so, control passes to step 462, and the server reads the next record in the given input file. When the end of the input file being read is detected at step 464, an end of file message is sent to the data access client at step 468 and control loops to step 446 for further iterative processing. If at step 464 the end of file has not been reached, control passes to step 466 whereupon the data retrieved at step 462 is returned to the data access client, and control passes to step 446.

If at step 454 the file transaction does not concern an input file, control passes to step 456 and determines whether the file transaction involved outputting information to a remote file. If so, control passes to step 460, and the desired information is written to the output file on the remote computer. Control then loops back to step 446. If at step 456 the file transaction concerns a file that is not designated for either output or indexed sequential input, an error message is sent to the data access client at step 458, and control loops back to step 446.

Figure 13:
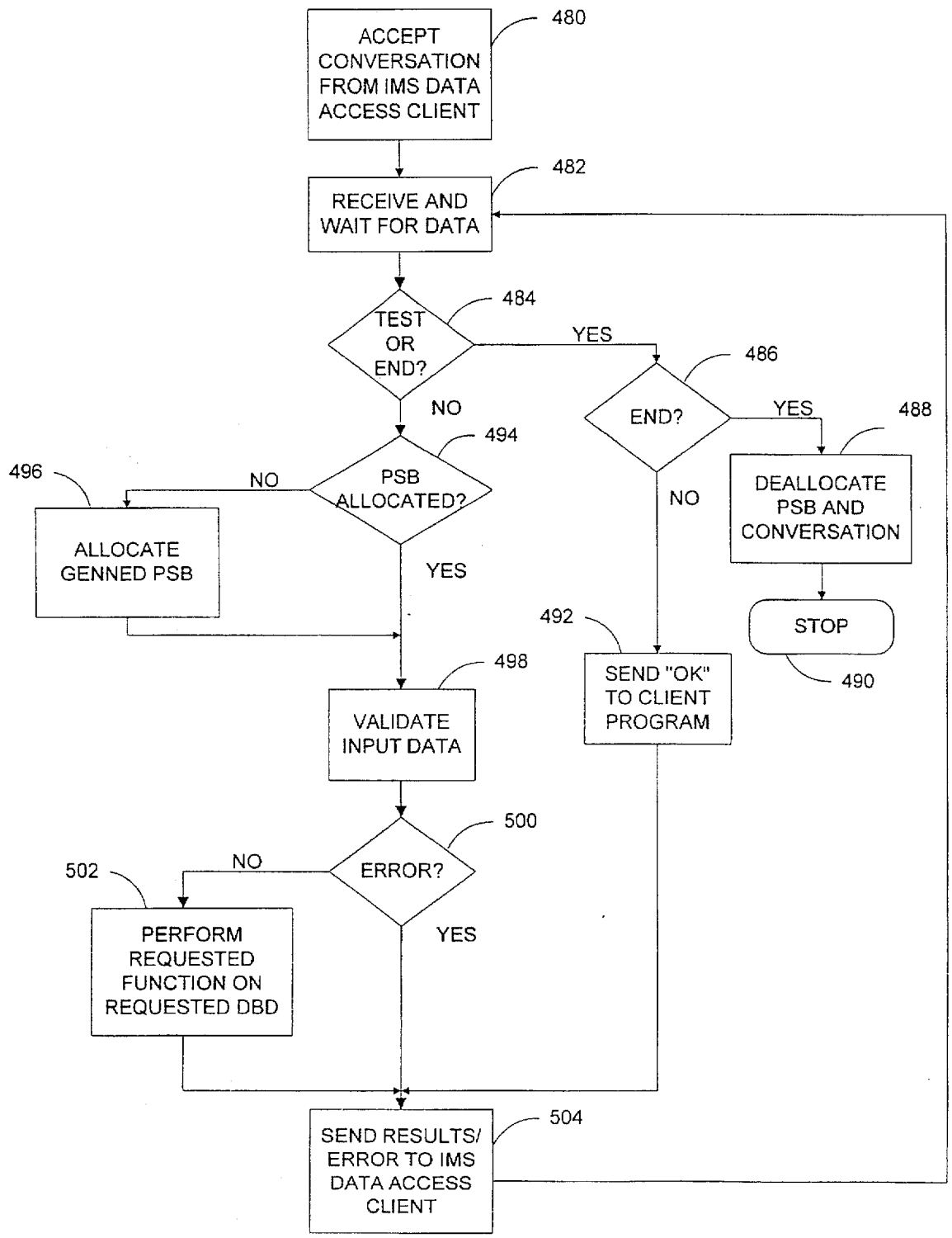
FIG. 13 is a flowchart of the data access server program for files having the IMS format.

FIG. 13 is a flowchart of the data access server for IMS files which, in cooperation with the data access client program for IMS files illustrated in FIG. 10, enables an application program on the local computer to access IMS files on a remote computer. The data access server resides on the remote computer and initially begins by accepting a conversation from the PC at step 480, as will be understood by those skilled in the art. At step 482, the data access server receives and waits for additional data. When data is received, control then passes to step 484, where it is determined whether the information sent was either a test or an end message. If the message was of either type, control passes to step 486 to determine whether the message was one to end the data access server program. If so, control passes to step 488 whereupon the PSB and the server program are deallocated, and further processing is halted at step 490. If, on the other hand, it is determined at step 486 that the message was not an end message, then the message was a test message to verify the proper allocation of the data access server. At step 492, an "OK" or similar message is sent to the client program acknowledging that the server is present and properly operating. Thereupon control passes to step 504 where the message is formally transmitted to the data access client program for IMS files, and control loops back to step 482 to await additional file transaction requests from the application program.

If at step 484 neither a test message nor an end message were received, it is assumed that a file transaction involving data access was requested. The data access server then determines at step 494 whether a PSB on the remote computer is allocated. If so, control passes to step 498. If the PSB has not been allocated, the data access server allocates the generated PSB at step 496, and control passes to step 498 to validate the input data received from the application program. If at step 500, the data server determines that the application program provided invalid data, then control passes to step 504 to send an error message to the data access client. If, on the other hand, no error occurred at step 500, then at step 502, the server is adapted to perform the requested function on the requested IMS data. Thereafter, control passes to step 504, and the results of any requested function are returned to the data access client. Control loops back to step 482 for further processing.

Figure 14:
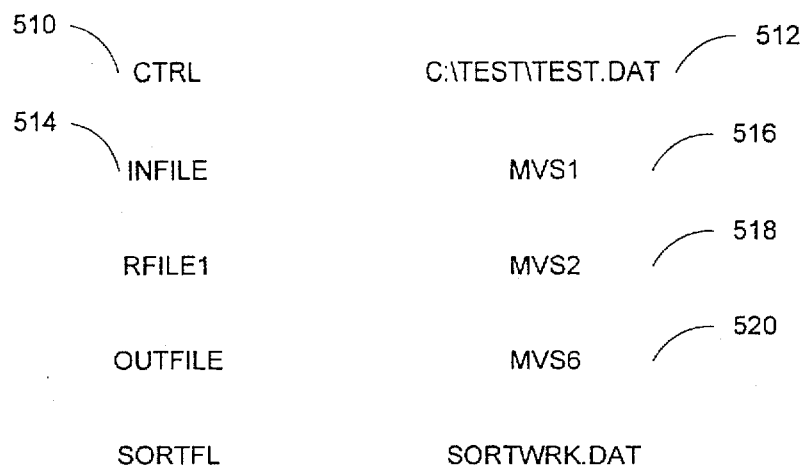
FIG. 14 is an illustration of the contents of a map file for use with the invention.

FIG. 14 is a sample of a map file for use in an application development system for accessing sequential or indexed sequential access formatted files. The map file shown is of a type compatible with the Micro Focus Programmer's Workbench application development system. The map file shown generally comprises two columns. The left-hand column is the data set name by which a given file is referenced in an application program compiled using the application development system. The right-hand column typically contains the more fully qualified file name for the data set name in the left-hand column. For example, the application program might reference a data set such as "CTRL" at 510. The map file then provides that an application program call to "CTRL" is to utilize the actual file 512 "C:\TEST\TEST.DAT". In this way, data sets can be conveniently cross-referenced to various corresponding fully qualified file names without having to alter source code. For those files residing on a remote computer, the invention provides a file designator, here illustrated as having the prefix "MVS" indicating that the designated file resides on a remote computer. The application development system working together with the data access client program can then determine whether a request to access remote data has been issued. As shown in FIG. 14, data set 514 "INFILE", when referenced by an application program compiled using the application development system, is referred to file designator 516 "MVS1". By using the file designator prefix "MVS", the invention detects that remote file access is necessary. The data access client is then adapted to communicate to the data access server the designator of the remote file to access. The server could well be configured to access the first file stored in the previously created FILE1 on the remote computer when the "MVS" designator prefix is supplied with a "1". Similarly, remote file designator 518 "MVS2" could correspond to the second file name in FILE1. The numbering convention could be employed such that, for example, "MVS1" through "MVS5" would reference a remote input file whose file attributes were stored in FILE1. Another desired numeric indicator is employed for input files having an indexed sequential access format. File designator 520 "MVS6" could reference a remote output file whose name is stored in FILE3. The map file can be created in a variety of ways, including through use of a text editor.

FIG. 15 is an illustration of the DBD cross-reference table of the present invention. As will be understood by those skilled in the art, the table utilizes the "generated" DBD information residing on the local computer for various DBDs that have been downloaded to the local computer. It then permits the user to indicate the desired PSBs and PCBs to be utilized for remote access of an IMS file. Preferably, the user is allowed to access this information for editing directly on the monitor. A column 530 for an Item Number is provided for the convenience of the user in further distinguishing the lines of information in the DBD cross-reference table. The column 532 "DBD Name" contains the name of the DBD to be accessed on the remote computer. Column 534 "PSB Name" contains the name of a PSB that will be used by the data access client program in accessing the DBD referenced on the same line. Column 536 "PCB Name" contains the name of the PCB in the designated PSB that will be used for accessing the referenced DBD. For example, the line in FIG. 15 beginning with item number 538, which is "08", references at 540 the DBD named "ERMOMSTR". The PSB that will be used to access this DBD is shown at 542 as "PC001A01". Typically, a copy of the PSB downloaded from the remote computer will be stored on the local computer, and the cross-reference table will contain the local name of the PSB. The PCB to be used within PSB PC001A01 is 544 "ERMOMSTR". By changing information in the cross-reference table, the user can cause requests for IMS data issued by the application program on the local computer to be directed to various IMS data files stored on the remote computer.

Figure 16:
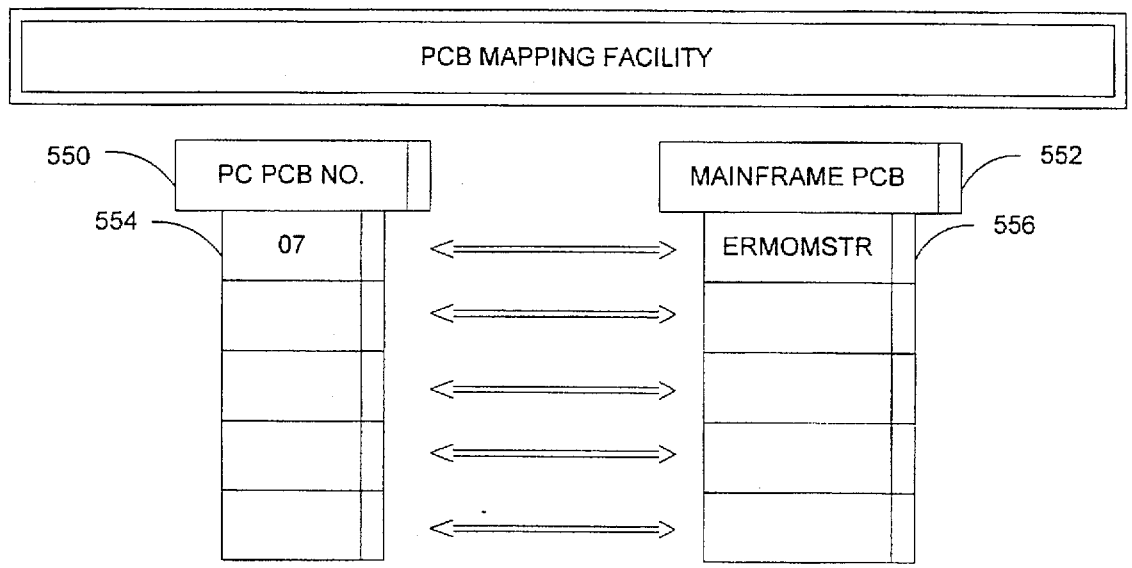
FIG. 16 is an illustration of the PCB cross-reference table of the present invention.

FIG. 16 is an illustration of the PCB cross-reference table of the present invention. As will be understood by those skilled in the art, the table utilizes the "generated" PSB information stored on the local computer. PCB's are referenced sequentially within the PSB, and PCB numbers are accordingly contained in the cross-reference table. This table cross-references the PCBs on the local computer to a specific PCB in the PSB on the remote computer associated with a particular DBD. The PCB cross-reference facility could be used if more than one PCB will be used by an application program to access the IMS data file. Alternatively, a user might wish to custom-design a PCB that is not currently in a PSB stored on the remote computer. In such a case, the user can add a PCB and redirect the system to use the desired PCB accordingly. Preferably, a default PCB will be selected for the user and displayed to the user in the FIG. 15 DBD display. In some instances, the user may be able to simply utilize the default PCB and not need to specially designate an alternate PCB.

As shown in FIG. 16, column 550 contains the local computer PCB Number information. Column 552 contains the corresponding PCB on the remote computer to which the PC PCB is cross-referenced. For example, in a selected PSB, the seventh PCB is referenced at 554. This PCB is cross-referenced to PCB 556 "ERMOMSTR" on the remote computer. Additional PCBs could also be specified. The application program will be able to reference those additional PCBs contained in this cross-reference table.

Figure 17:
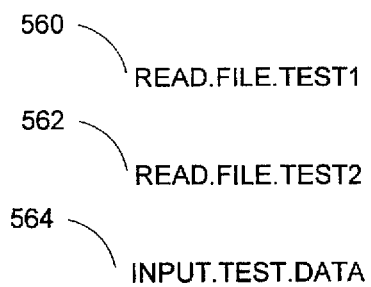
FIG. 17 is an illustration of the contents of a file created by the file attribute server program storing the fully qualified names of files on the remote computer to be accessed.

FIG. 17 is a sample of a file, such as FILE1, created by the file attribute server program to store the file attributes of desired files. By way of illustration, this file contains three lines, each containing the fully qualified file name for use with the well-known mainframe computer operating system MVS. Lines 560, 562 and 564 contain the names of files to be accessed that reside on the remote computer. The file names at 560, 562 and 564 preferably correspond sequentially to references "MVS1", "MVS2" and "MVS3" in the map file on the local computer. Thus, a reference to "MVS1" directs the data access server program to access, in this example, file 560 "READ.FILE.TEST1".

In operation, a user could begin by storing on a designated computer the file attributes for a remote file to be accessed for input or output. For a remote file having a sequential access or indexed sequential access format, the file attributes, as discussed above, are preferably stored on the remote computer containing the remote file. As noted above, one feature of the invention provides a file attribute client program and a file attribute server program enabling a user to enter this information for sequential or indexed sequential remote files. For remote files having the IMS format, the file attributes include the DBD and the PSB for the remote IMS file to be accessed. The DBD and PSB are placed on the local computer and, as necessary, generated. The user can further employ the cross-referencing capability of the invention for designating a selected DBD, PSB or PCB to be utilized.

After storing the file attributes, the user preferably creates a map file cross-referencing desired file names used in the application program at least for files having a sequential or indexed sequential file format. For each such remote file to be accessed, the map file preferably will contain a remote file designator, such as "MVS1" associated with the name of the file as referenced by the application program, such as "INFILE".

If a remote computer having security procedures is to be accessed, the invention provides a network access capability for the user to enter the security information. The user preferably enters this information before attempting to access the remote file. Thereafter, the user generally need not again enter the security information when data on the remote computer is accessed by the user's application program during a particular session. In addition, if the user desires to access a remote file having the IMS format, the user must perform the necessary initializations for such access on the remote computer, preferably as provided by the invention.

After the above information has been provided, an application development system can then be employed in conjunction with the application program. During execution of the application program, the data access client in conjunction with the application development system is adapted to respond to a command seeking remote data access. Thereupon, the data access client program transmits a data access command to the data access server program on the remote computer. The data access server obtains the file attributes of the remote file being accessed. It then implements the command received and communicates the results to the data access client, which returns the desired information to the application program. In this way, data on a remote computer can be directly accessed by an application program on a local computer as if the application program were executing on the remote computer itself. Such accessing transactions include reading from, writing to, modifying or deleting the remote data file.

From the foregoing, it will be seen that this invention is one well adapted to attain all the ends and objects hereinabove set forth together with other advantages which are obvious and which are inherent.

It will be understood that certain features and subcombinations are of utility and may be employed without reference to other features and subcombinations. This is contemplated by and is within the scope of the claims. In particular, the invention is not limited to any particular network topology. The invention could well be adapted for use within a Local Area Network (LAN) that is itself linked electronically to a remote computer containing a data file. LAN users might well access a LAN server using a PC.

Since many possible embodiments may be made of the invention without departing from the scope thereof, it is to be understood that all matter herein set forth or shown in the accompanying drawings is to be interpreted as illustrative and not limiting sense.

The invention claimed is:

1. A system for accessing a data file on a remote computer by an application program within a COBOL application development system on a local computer over a communication link enabling electronic data transfer between the local computer and the remote computer, said system comprising:

an attribute file stored on a predetermined computer, said attribute file containing file attributes for the data file;

a data access server program adapted to run on the remote computer, to communicate over the communication link, to obtain said file attributes and thereby to access the data file; and a data access client program adapted to run on the local computer, said data access client program being adapted to communicate with said data access server program over the communication link and with the application program within the COBOL application development system on the local computer, thereby enabling the application program to access the data file.

2. The system of claim 1, wherein said data access server program is adapted to communicate over the communication link using the Advanced Program to Program Communication protocol.

3. The system of claim 1, wherein said data access client program is adapted to communicate over the communication link using the Advanced Program to Program Communication protocol.

4. The system of claim 1, wherein said data access client program and said data access server program are adapted to access the data file on the remote computer stored in a sequential access format.

5. The system of claim 1, wherein said data access client program and said data access server program are adapted to access the data file on the remote computer stored in an indexed sequential access format.

6. The system of claim 1, wherein said data access client program and said data access server program are adapted to access the data file on the remote computer stored in a random access format.

7. The system of claim 1, wherein said data access client program and said data access server program are adapted to access the data file on the remote computer stored in a format accessible by a database management program.

8. The system of claim 7, wherein the format is the Information Management System format.

9. The system of claim 1, further comprising means for communicating network security information to the remote computer from the local computer to enable the application program on the local computer to access the data file.

10. The system of claim 1, wherein said data access server program and said data access client program are adapted to enable the application program on the local computer to modify data on the remote computer.

11. The system of claim 1, wherein said data access server program and said data access client program are adapted to enable the application program on the local computer to store data on the remote computer.

12. The system of claim 1, wherein said predetermined computer is the remote computer.

13. The system of claim 1, wherein said predetermined computer is the local computer.

14. The system of claim 1, further comprising a map file stored on the local computer containing a file designator for the data file.

15. The system of claim 14, wherein said data access client program is further adapted to determine, based on said map file, whether to communicate with said data access server program to access the data file.

16. The system of claim 1, wherein said system is adapted to access the data file one record at a time.

17. A system for accessing a data file on a remote computer by an application program within a COBOL application development system executing on a local computer, said system comprising:

a remote computer containing the data file;

a local computer;

a communication link enabling the transfer of data between said remote computer and said local computer;

an attribute file stored on a predetermined computer, said attribute file containing file attributes for the data file;

a data access server program adapted to run on said remote computer, to communicate over said communication link, to obtain said file attributes and to access the data file; and a data access client program adapted to run on said local computer, said data access client program being adapted to communicate with said data access server program over said communication link and with the application program within the COBOL application development system on said local computer, thereby enabling the application program to access the data file.

18. The system of claim 17, wherein said data access server program is adapted to communicate over said communication link using the Advanced Program to Program Communication protocol.

19. The system of claim 17, wherein said data access client program is adapted to communicate over said communication link using the Advanced Program to Program Communication protocol.

20. The system of claim 17, wherein said data access client program and said data access server program are adapted to access the data file on said remote computer stored in a sequential access format.

21. The system of claim 17, wherein said data access client program and said data access server program are adapted to access the data file on said remote computer stored in an indexed sequential access format.

22. The system of claim 17, wherein said data access client program and said data access server program are adapted to access the data file on said remote computer stored in a random access format.

23. The system of claim 17, wherein said data access client program and said data access server program are adapted to access the data file on said remote computer stored in a format accessible by a database management program.

24. The system of claim 23, wherein the format is the Information Management System format.

25. The system of claim 17, further comprising means for communicating network security information to said remote computer from said local computer to enable the application program on said local computer to access the data file.

26. The system of claim 17, wherein said data access server program and said data access client program are adapted to enable the application program on said local computer to modify data on said remote computer.

27. The system of claim 17, wherein said data access server program and said data access client program are adapted to enable the application program on said local computer to store data on said remote computer.

28. The system of claim 17, wherein said predetermined computer is said remote computer.

29. The system of claim 17, wherein said predetermined computer is said local computer.

30. The system of claim 17, further comprising a map file stored on said local computer containing a file designator for the data file on said remote computer.

31. The system of claim 30, wherein said data access client program is further adapted to determine, based on said map file, whether to communicate with said data access server program to access the data file.

32. The system of claim 17, wherein said system is adapted to access the data file one record at a time.

33. A remote data access method for use in a data processing system having a remote computer containing data, a local computer containing an application program within a COBOL application development system adapted to access data, and a communication link enabling the transfer of data between the remote computer and the local computer, said method comprising:

storing an attribute file on a predetermined computer, the attribute file containing file attributes for a data file residing on the remote computer;

issuing a file transaction request from the application program to access the data file;

transmitting the file transaction request from the local computer to the remote computer over the communication link;

accessing the data file as directed by the file transaction request and the file attributes; and transmitting over the communication link the results of the file transaction request from the remote computer to the application program within the COBOL application development system on the local computer.

34. The method of claim 33, wherein the remote computer is adapted to communicate over the communication link using the Advanced Program to Program Communication protocol.

35. The method of claim 33, wherein the local computer is adapted to communicate over the communication link using the Advanced Program to Program Communication protocol.

36. The method of claim 33, wherein the data file has a sequential access format.

37. The method of claim 33, wherein the data file has an indexed sequential access format.

38. The method of claim 33, wherein the data file has a random access format.

39. The method of claim 33, wherein the data file is stored in a format accessible by a database management program.

40. The method of claim 39, wherein the format is the Information Management System format.

41. The method of claim 33, further comprising communicating network security information to the remote computer from the local computer to enable the application program on the local computer to access the data file.

42. The method of claim 33, wherein accessing the data file on the remote computer includes modifying data on the remote computer.

43. The method of claim 33, wherein accessing the data file on the remote computer includes storing data on the remote computer.

44. The method of claim 33, wherein the predetermined computer is the remote computer.

45. The method of claim 33, wherein the predetermined computer is the local computer.

46. The method of claim 33, further comprising storing in a map file on the local computer a file designator for the data file.

47. The method of claim 46, further comprising determining from the map file whether to transmit a file transaction request from the local computer to the remote computer.

48. A system for accessing a data file stored in the Information Management System (IMS) format on a remote computer by an application program within a COBOL application development system on a local computer over a communication link enabling electronic data transfer between the local computer and the remote computer, said system comprising:

an attribute file stored on a predetermined computer, said attribute file containing file attributes for the data file;

a data access server program adapted to run on the remote computer, to communicate over the communication link, to obtain said file attributes and based thereon to access the data file; and a data access client program adapted to run on the local computer, said data access client program being adapted to communicate with said data access server program over the communication link and with the application program within the COBOL application development system on the local computer, thereby enabling the application program to access the data file.

49. The system of claim 48, wherein said data access server program is adapted to communicate over the communication link using the Advanced Program to Program Communication protocol.

50. The system of claim 48, wherein said data access client program is adapted to communicate over the communication link using the Advanced Program to Program Communication protocol.

51. The system of claim 48, wherein said file attributes include the name of a Data Base Definition for the data file.

52. The system in claim 51, wherein said file attributes include the name of a Program Specification Block for the data file.

53. The system of claim 52, wherein said file attributes include a Program Control Block within the Program Specification Block for the data file.

54. The system of claim 53, wherein said predetermined computer is the local computer.

55. The system of claim 54, further comprising means for interactively storing said file attributes in said attribute life.

56. A system for accessing a data file stored in a sequential access format on a remote computer by an application program within a COBOL application development system on a local computer over a communication link enabling electronic data transfer between the local computer and the remote computer, said system comprising:

an attribute file stored on a predetermined computer, said attribute file containing file attributes for the data file;

a data access server program adapted to run on the remote computer, to communicate over the communication link, to obtain said file attributes and based thereon to access the data file; and a data access client program adapted to run on the local computer, said data access client program being adapted to communicate with said data access server program over the communication link and with the application program within the COBOL application development system on the local computer, thereby enabling the application program to access the data file.

57. The system of claim 56, wherein said data access server program is adapted to communicate over the communication link using the Advanced Program to Program Communication protocol.

58. The system of claim 56, wherein said data access client program is adapted to communicate over the communication link using the Advanced Program to Program Communication protocol.

59. The system of claim 56, wherein said predetermined computer is the remote computer.

60. The system of claim 56, wherein said predetermined computer is the local computer.

61. The system of claim 56, further comprising a map file containing a file designator for the data file.

62. The system of claim 56, wherein said data access client program is further adapted to determine, based on said map file, whether to communicate with said data access server program to access the data file.

63. A system for accessing a data file stored in an indexed sequential access format on a remote computer by an application program within a COBOL application development system on a local computer over a communication link enabling electronic data transfer between the local computer and the remote computer, said system comprising:

an attribute file stored on a predetermined computer, said attribute file containing file attributes for the data file;

a data access server program adapted to run on the remote computer, to communicate over the communication link, to obtain said file attributes and based thereon to access the data file; and a data access client program adapted to run on the local computer, said data access client program being adapted to communicate with said data access server program over the communication link and with the application program within the COBOL application development system on the local computer, thereby enabling the application program to access the data file.

64. The system of claim 63, wherein said data access server program is adapted to communicate over the communication link using the Advanced Program to Program Communication protocol.

65. The system of claim 63, wherein said data access client program is adapted to communicate over the communication link using the Advanced Program to Program Communication protocol.

66. The system of claim 63, wherein said predetermined computer is the remote computer.

67. The system of claim 63, wherein said predetermined computer is the local computer.

68. The system of claim 63, further comprising a map file containing a file designator for the data file.

69. The system of claim 63, wherein said data access client program is further adapted to determine, based on said map file, whether to communicate with said data access server program to access the data file.

70. A system for storing the file attributes of a data file stored on a remote computer from a local computer having a communication link enabling electronic data transfer between the local computer and the remote computer, said system comprising:

a file attribute client program adapted to run on the local computer, said file attribute client being adapted to communicate over the communication link to enable the user to enter file attributes for the data file; and a file attribute server program on the remote computer adapted to communicate over the communication link and adapted to receive the file attributes from said file attribute client and to store the file attributes in an attribute file on a predetermined computer.

71. The system of claim 70, wherein said file attribute server program is adapted to communicate over the communication link using the Advanced Program to Program Communication protocol.

72. The system of claim 70, wherein said file attribute client program is adapted to communicate over the communication link using the Advanced Program to Program Communication protocol.

73. The system of claim 70, wherein the predetermined computer is the remote computer.

74. The system of claim 1, further comprising means for interactively storing said file attributes in said attribute file.

75. The system of claim 56, further comprising means for interactively storing said file attributes in said attribute file.

76. The system of claim 63, further comprising means for interactively storing said file attributes in said attribute file.

77. A system for accessing a data file on a remote computer by an application program within a COBOL application development system on a local computer over a communication link enabling electronic data transfer between the local computer and the remote computer, said system comprising:

an attribute file stored on a predetermined computer, said attribute file containing file attributes for the data file;

data access server means on the remote computer for communicating over the communication link, obtaining said file attributes and accessing the data file; and data access client means on the local computer for communicating with said data access server means over the communication link and with the application program within the COBOL application development system on the local computer, thereby enabling the application program to access the data file.

78. The system of claim 77, wherein the data file is stored in one of a plurality of formats and said data access server means and said data access client means are adapted to access the data file when stored in each of said plurality of formats.

79. The system of claim 77, further comprising means for communicating network security information to the remote computer from the local computer to enable the application program on the local computer to access the data file.

80. The system of claim 77, wherein said predetermined computer is the remote computer.

81. The system of claim 77, wherein said predetermined computer is the local computer.

82. The system of claim 77, further comprising a map file stored on the local computer containing a file designator for the data file.

83. The system of claim 82, wherein said data access client means is further adapted to determine, based on said map file, whether to communicate with said data access server means to access the data file.

84. The system of claim 77, further comprising means for interactively storing said file attributes in said attribute file.

85. The system of claim 77, wherein said system is adapted to access the data file one record at a time.

* * * * *